(12) United States Patent
    Austrheim et al.

(10) Patent No.:     US 12,649,627 B2
(45) Date of Patent:          Jun. 9, 2026

(54) CONTAINER HANDLING VEHICLE

(71) Applicant: Autostore Technology AS, Nedre Vats (NO)

(72) Inventors: Trond Austrheim, Etne (NO); Ole Alexander Mæhle, Etne (NO); Ingvar Fagerland, Kolnes (NO)

(73) Assignee: AutoStore Technology AS, Nedre Vats (NO)

( * ) Notice: Subject to any disclaimer, the term of this patent is extended or adjusted under 35 U.S.C. 154(b) by 856 days.

(21) Appl. No.: 17/924,217

(22) PCT Filed: May 18, 2021

(86) PCT No.: PCT/EP2021/063130
    § 371 (c)(1),
    (2) Date: Nov. 9, 2022

(87) PCT Pub. No.: WO2021/239509
    PCT Pub. Date: Dec. 2, 2021

(65) Prior Publication Data
    US 2023/0174302 A1     Jun. 8, 2023

(30) Foreign Application Priority Data

May 25, 2020    (NO) .................................... 20200612

(51) Int. Cl.
    *B65G 1/04*          (2006.01)
    *B60B 19/00*         (2006.01)
    *B65G 1/06*          (2006.01)
(52) U.S. Cl.
    CPC ............ *B65G 1/065* (2013.01); *B60B 19/003* (2013.01); *B65G 1/0464* (2013.01); *B65G 1/0478* (2013.01); *B65G 2201/0235* (2013.01)
(58) Field of Classification Search
    None
    See application file for complete search history.

(56) References Cited

U.S. PATENT DOCUMENTS

| | | | | |
|---|---|---|---|---|
| 11,167,921 B2 * | 11/2021 | Austrheim | ........... | B65G 1/0492 |
| 11,807,452 B2 * | 11/2023 | Fjeldheim | .............. | B65G 60/00 |

(Continued)

FOREIGN PATENT DOCUMENTS

| | | |
|---|---|---|
| CA | 3099204 A1 | 12/2019 |
| CN | 105473446 A1 | 4/2016 |

(Continued)

OTHER PUBLICATIONS

Zhao Lei, Notification of First Office Action and Search Report for Chinese Patent Application No. 2021800377379, dated Feb. 27, 2025, 17 pages, pub. by SIPO, Beijing, PRC China.

(Continued)

*Primary Examiner* — Mark C Hageman
(74) *Attorney, Agent, or Firm* — Baker Botts L.L.P.

(57)          ABSTRACT

A container handling vehicle for lifting a storage container from an underlying framework structure includes a vehicle body and a container lifting assembly for lifting the storage container. The vehicle body includes a wheeled base, a support, and at least one cantilevered section. The wheeled base includes a first set of wheels, arranged on opposite sides of the vehicle body, for moving the vehicle along a first direction on a rail grid at a top level of the underlying framework structure, and a second set of wheels arranged on other opposite sides of the vehicle body, for moving the vehicle along a second direction on the rail grid, the second direction being perpendicular to the first direction. The support includes a lower end connected to the wheeled base and an upper portion connected to the cantilevered section. The container lifting assembly includes a lifting frame and a plurality of lifting bands. The lifting frame is for releasable connection to a storage container and suspended from the cantilevered section by the lifting bands, such that the lifting frame may be raised or lowered relative to the cantilevered (Continued)

section. The cantilevered section extends laterally from the upper portion of the support and is arranged to rotate horizontally about a vertical axis relative to the wheeled base between a first position and a second position. In the first position, the cantilevered section extends beyond the wheeled base, such that the lifting frame may retrieve or deliver a storage container from/to a storage column of the framework structure. In the second position the cantilevered section extends in an opposite direction relative to the direction in the first position. The support holds the cantilevered section above the wheeled base at a height corresponding to a height of multiple storage containers, such that a vertical distance between the lifting frame, when the lifting frame is in an upper position, and the lower end of the support is larger than the height of two storage containers stacked on top of each other.

17 Claims, 23 Drawing Sheets

(56)  References Cited

U.S. PATENT DOCUMENTS

| | | | | | |
|---|---|---|---|---|---|
| 12,071,302 | B2 * | 8/2024 | Austrheim | .............. | B66C 23/50 |
| 2017/0121109 | A1 | 5/2017 | Behling | | |
| 2018/0319590 | A1 | 11/2018 | Lindbo et al. | | |
| 2019/0322451 | A1 | 10/2019 | Bastian et al. | | |
| 2023/0142253 | A1 * | 5/2023 | Heggebø | .............. | B65G 1/0464 |
| | | | | | 700/218 |

FOREIGN PATENT DOCUMENTS

| | | | | | |
|---|---|---|---|---|---|
| CN | 110461757 | A | 11/2019 | | |
| JP | S60195266 | U | 12/1985 | | |
| KR | 1020180081741 | A | 7/2018 | | |
| NO | 20171874 | * | 5/2019 | .............. | B65G 1/04 |
| NO | 20181098 | A1 | 12/2019 | | |
| WO | 317366 | B1 | 10/2004 | | |
| WO | 2013/167907 | A1 | 11/2013 | | |
| WO | 2014/075937 | A1 | 5/2014 | | |
| WO | 2014/090684 | A1 | 6/2014 | | |
| WO | 2015/140216 | A1 | 9/2015 | | |
| WO | 2015/193278 | A1 | 12/2015 | | |
| WO | 2018/146304 | A1 | 8/2018 | | |
| WO | 2018/162757 | A1 | 9/2018 | | |
| WO | 2019/101366 | A1 | 5/2019 | | |
| WO | 2019/101725 | A1 | 5/2019 | | |
| WO | 2019238697 | A1 | 12/2019 | | |
| WO | 2020/094339 | A1 | 5/2020 | | |

OTHER PUBLICATIONS

International Search Report issued in Application No. PCT/EP2021/063130 mailed on Jul. 30, 2021 (4 pages).

Written Opinion issued in Application No. PCT/EP2021/063130 mailed on Jul. 30, 2021 (9 pages).

Norwegian Search Report issued in Norwegian Application No. 20200612 mailed on Dec. 22, 2022 (2 pages).

Coquau, Stephane, Extended European Search Report in EP24222287.5, mailed Jun. 10, 2025, 9 pages, European Patent Office, Munich, Germany.

Otsuka, Takako, Office Action in JP2022571790, mailed May 27, 2025, 13 pages, Japan Patent Office, Toyko, Japan.

Coquau, Stephane, Office Action for European Patent Application No. 21727815.9, dated Nov. 22, 2024, 6 pages, pub. by the EPO, Rijswijk Netherlands.

Anonymous, Office Action in Republic of Korea patent application 1020227044649, mailed Dec. 5, 2025, 20 pages, pub. by Korean Intellectual Property Office, Daejeon, Korea.

* cited by examiner

FIG. 1    (Prior Art)

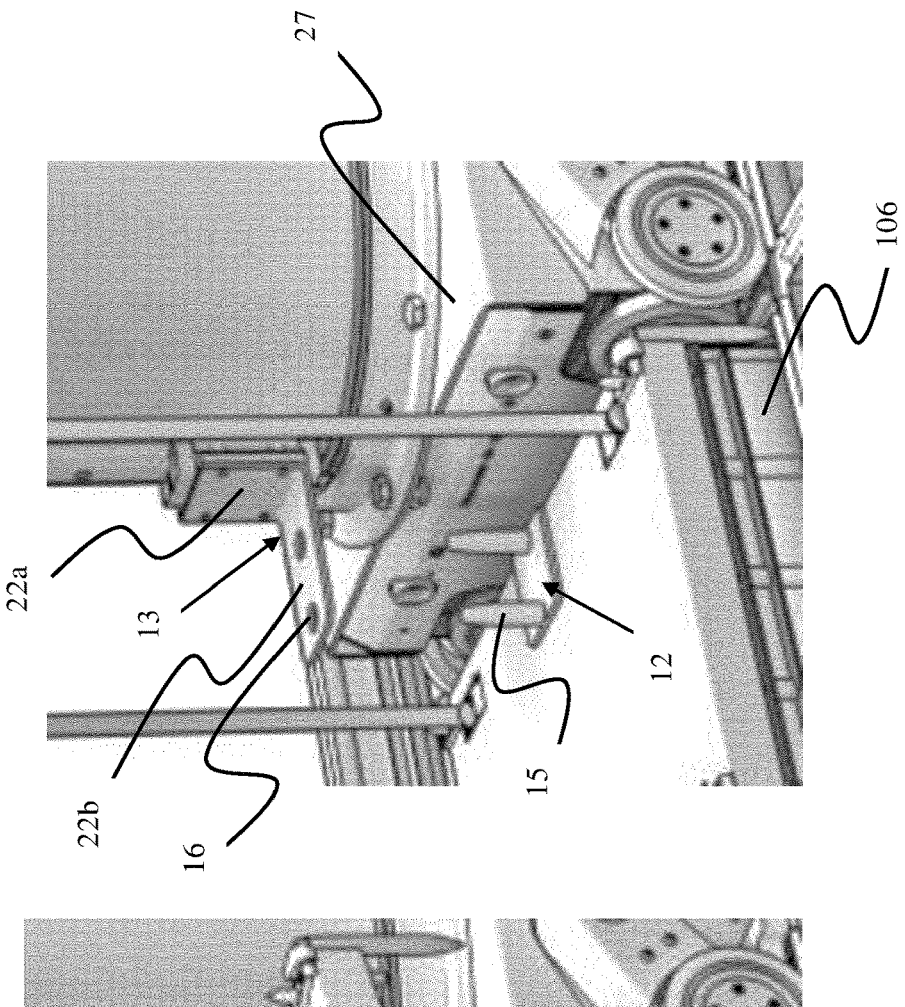
Fig. 10b (Detail B)
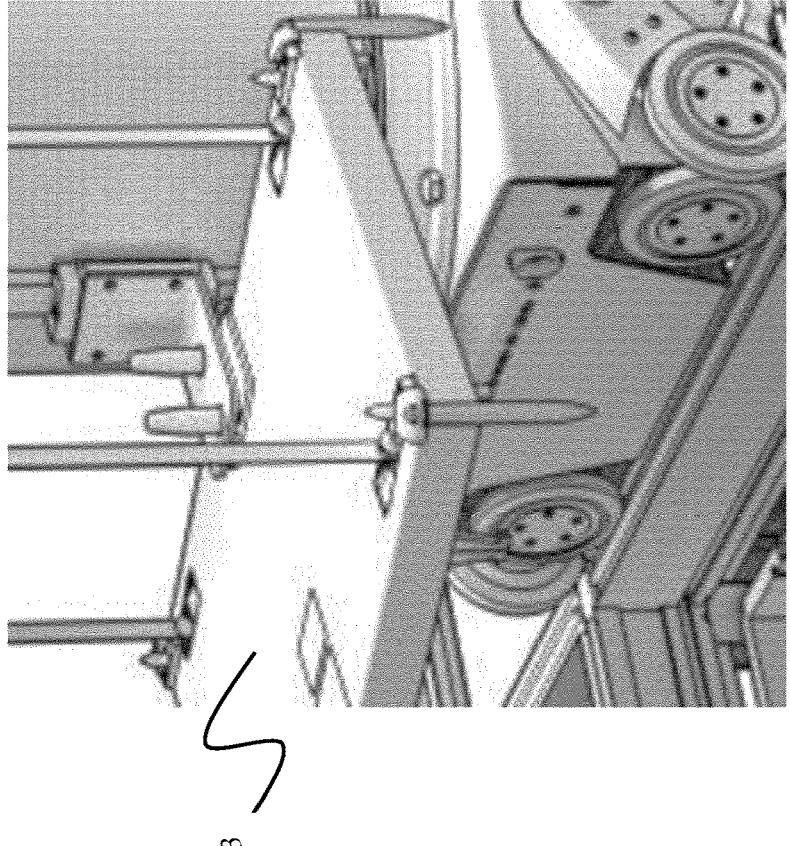
Fig. 10a (Detail A)

106

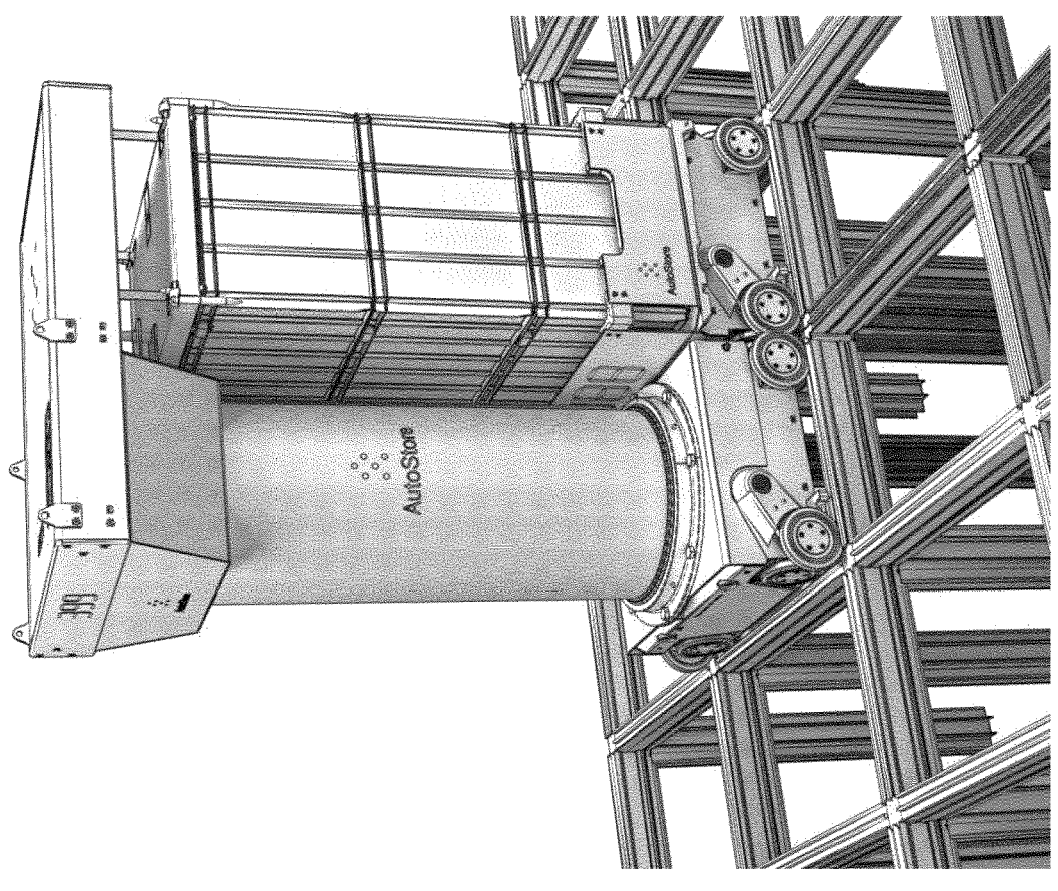
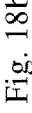
Fig. 18b
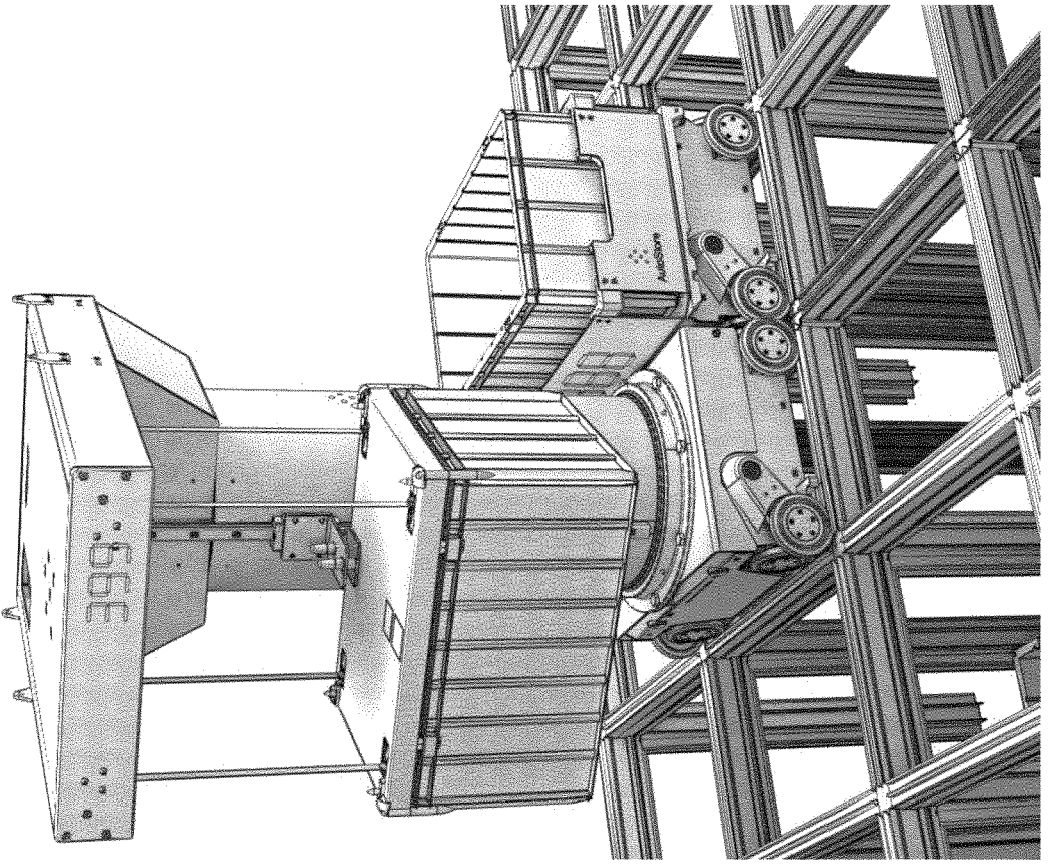
Fig. 18a

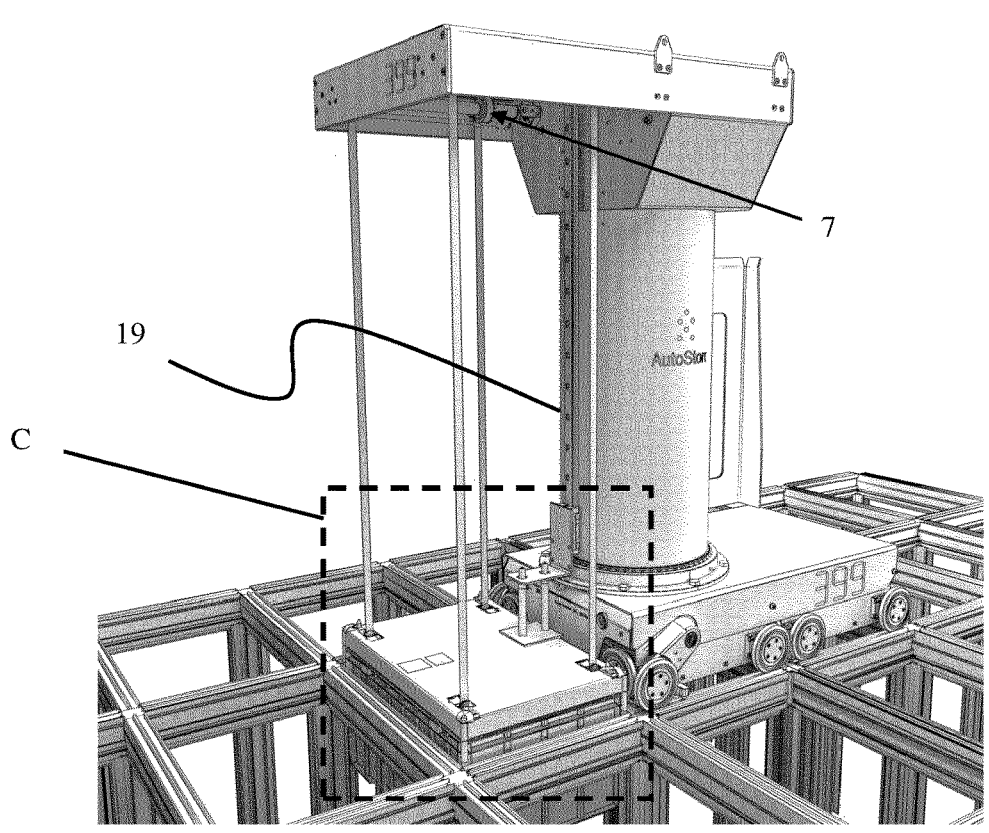
Fig. 23a
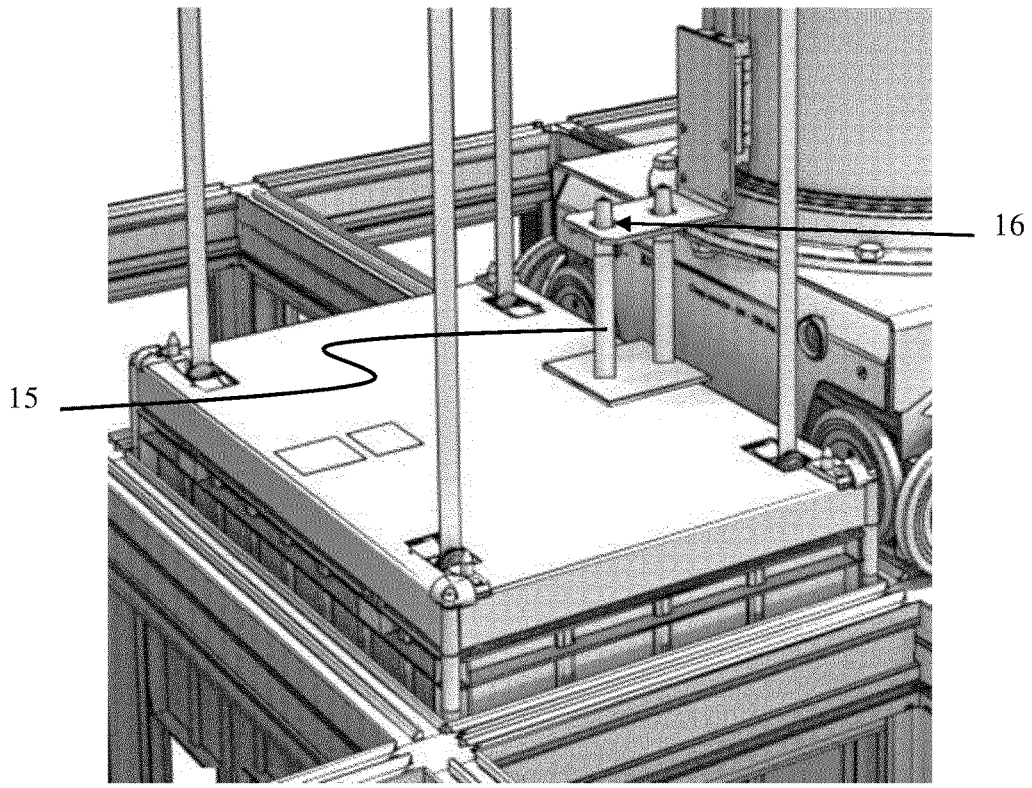
Fig. 23b (Detail C)

CONTAINER HANDLING VEHICLE

FIELD OF THE INVENTION

The present invention relates to a container handling vehicle, or robot, for picking up storage containers from a storage system, and a storage system comprising such a vehicle.

BACKGROUND AND PRIOR ART

FIG. 1 discloses a typical prior art automated storage and retrieval system 1 with a framework structure 100 and FIGS. 2 to 4 disclose two different prior art container handling vehicles 201,301 suitable for operating on such a system 1.

The framework structure 100 comprises upright members 102, horizontal members 103 and a storage volume comprising storage columns 105 arranged in rows between the upright members 102 and the horizontal members 103. In these storage columns 105 storage containers 106, also known as bins, are stacked one on top of one another to form stacks 107. The members 102, 103 may typically be made of metal, e.g. extruded aluminium profiles.

The framework structure 100 of the automated storage and retrieval system 1 comprises a rail system 108 arranged in a grid pattern across the top of framework structure 100, on which rail system 108 a plurality of container handling vehicles 201,301 are operated to raise storage containers 106 from, and lower storage containers 106 into, the storage columns 105, and also to transport the storage containers 106 above the storage columns 105. The horizontal extent of one of the grid cells 122 constituting the grid pattern is marked by thick lines.

The rail system 108 (i.e. a rail grid) comprises a first set of parallel rails 110 arranged to guide movement of the container handling vehicles 201,301 in a first direction X across the top of the frame structure 100, and a second set of parallel rails 111 arranged perpendicular to the first set of rails 110 to guide movement of the container handling vehicles 201,301 in a second direction Y which is perpendicular to the first direction X. Containers 106 stored in the columns 105 are accessed by the container handling vehicles through access openings 112 in the rail system 108. The container handling vehicles 201,301 can move laterally above the storage columns 105, i.e. in a plane which is parallel to the horizontal X-Y plane. Commonly, at least one of the sets of rails 110,111 is made up of dual-track rails allowing two container handling vehicles to pass each other on neighbouring grid cells 122. Dual-track rails are well-known and disclosed in for instance WO 2015/193278 A1 and WO 2015/140216 A1, the contents of which are incorporated herein by reference.

The upright members 102 of the framework structure 100 may be used to guide the storage containers during raising of the containers out from and lowering of the containers into the columns 105. The stacks 107 of containers 106 are typically self-supportive.

Each prior art container handling vehicle 201,301 comprises a vehicle body 201a,301a, and first and second sets of wheels 201b,301b,201c,301c which enable the lateral movement of the container handling vehicles 201,301 in the X direction and in the Y direction, respectively. In FIGS. 2 and 3 two wheels in each set are fully visible. The first set of wheels 201b,301b is arranged to engage with two adjacent rails of the first set 110 of rails, and the second set of wheels 201c,301c is arranged to engage with two adjacent rails of the second set 111 of rails. At least one of the sets of wheels 201b,301b,201c,301c can be lifted and lowered, so that the first set of wheels 201b,301b and/or the second set of wheels 201c,301c can be engaged with the respective set of rails 110, 111 at any one time.

Each prior art container handling vehicle 201,301 also comprises a container lifting assembly 2 (shown in FIG. 4) for vertical transportation of storage containers 106, e.g. raising a storage container 106 from, and lowering a storage container 106 into, a storage column 105. The container lifting assembly 2 comprises a lifting frame 3 having one or more gripping/engaging devices 4 adapted to engage a storage container 106 and guide pins 304 for correct positioning of the lifting frame 3 relative to the storage container 106. The lifting frame 3 can be lowered from the vehicle 201,301 by lifting bands 5 so that the position of the lifting frame with respect to the vehicle 201,301 can be adjusted in a third direction Z which is orthogonal the first direction X and the second direction Y.

The lifting frame 3 (not shown) of the container handling vehicle 201 in FIG. 2 is located within a cavity of the vehicle body 201a.

Conventionally, and also for the purpose of this application, Z=1 identifies the uppermost layer of storage containers, i.e. the layer immediately below the rail system 108, Z=2 the second layer below the rail system 108, Z=3 the third layer etc. In the exemplary prior art disclosed in FIG. 1, Z=8 identifies the lowermost, bottom layer of storage containers. Similarly, X=1 . . . n and Y=1 . . . n identifies the position of each storage column 105 in the horizontal plane. Consequently, as an example, and using the Cartesian coordinate system X, Y, Z indicated in FIG. 1, the storage container identified as 106' in FIG. 1 can be said to occupy storage position X=10, Y=2, Z=3. The container handling vehicles 201,301 can be said to travel in layer Z=0, and each storage column 105 can be identified by its X and Y coordinates.

The storage volume of the framework structure 100 has often been referred to as a grid 104, where the possible storage positions within this grid are referred to as storage cells. Each storage column may be identified by a position in an X- and Y-direction, while each storage cell may be identified by a container number in the X-, Y and Z-direction.

Each prior art container handling vehicle 201,301 comprises a storage compartment or space for receiving and stowing a storage container 106 when transporting the storage container 106 across the rail system 108. The storage space may comprise a cavity arranged centrally within the vehicle body 201a as shown in FIG. 2 and as described in e.g. WO2015/193278A1, the contents of which are incorporated herein by reference.

FIG. 3 shows an alternative configuration of a container handling vehicle 301 with a cantilever construction. Such a vehicle is described in detail in e.g. NO317366, the contents of which are also incorporated herein by reference.

The central cavity container handling vehicles 201 shown in FIG. 2 may have a footprint that covers an area with dimensions in the X and Y directions which is generally equal to the lateral extent of a storage column 105, e.g. as is described in WO2015/193278A1, the contents of which are incorporated herein by reference. The term 'lateral' used herein may mean 'horizontal'.

Alternatively, the central cavity container handling vehicles 201 may have a footprint which is larger than the lateral area defined by a storage column 105, e.g. as is disclosed in WO2014/090684A1.

The rail system 108 typically comprises rails with grooves in which the wheels of the vehicles run. Alternatively, the rails may comprise upwardly protruding elements, where the wheels of the vehicles comprise flanges to prevent derailing. These grooves and upwardly protruding elements are collectively known as tracks. Each rail may comprise one track, or each rail may comprise two parallel tracks.

WO2018146304, the contents of which are incorporated herein by reference, illustrates a typical configuration of rail system 108 comprising rails and parallel tracks in both X and Y directions.

In the framework structure 100, a majority of the columns 105 are storage columns 105, i.e. columns 105 where storage containers 106 are stored in stacks 107. However, some columns 105 may have other purposes. In FIG. 1, columns 119 and 120 are such special-purpose columns used by the container handling vehicles 201,301 to drop off and/or pick up storage containers 106 so that they can be transported to an access station (not shown) where the storage containers 106 can be accessed from outside of the framework structure 100 or transferred out of or into the framework structure 100. Within the art, such a location is normally referred to as a 'port' and the column in which the port is located may be referred to as a 'port column' 119,120. The transportation to the access station may be in any direction, that is horizontal, tilted and/or vertical. For example, the storage containers 106 may be placed in a random or dedicated column 105 within the framework structure 100, then picked up by any container handling vehicle and transported to a port column 119,120 for further transportation to an access station. Note that the term 'tilted' means transportation of storage containers 106 having a general transportation orientation somewhere between horizontal and vertical.

In FIG. 1, the first port column 119 may for example be a dedicated drop-off port column where the container handling vehicles 201,301 can drop off storage containers 106 to be transported to an access or a transfer station, and the second port column 120 may be a dedicated pick-up port column where the container handling vehicles 201,301 can pick up storage containers 106 that have been transported from an access or a transfer station.

The access station may typically be a picking or a stocking station where product items are removed from or positioned into the storage containers 106. In a picking or a stocking station, the storage containers 106 are normally not removed from the automated storage and retrieval system 1 but are returned into the framework structure 100 again once accessed. A port can also be used for transferring storage containers to another storage facility (e.g. to another framework structure or to another automated storage and retrieval system), to a transport vehicle (e.g. a train or a lorry), or to a production facility.

A conveyor system comprising conveyors is normally employed to transport the storage containers between the port columns 119,120 and the access station.

If the port columns 119,120 and the access station are located at different levels, the conveyor system may comprise a lift device with a vertical component for transporting the storage containers 106 vertically between the port column 119,120 and the access station.

The conveyor system may be arranged to transfer storage containers 106 between different framework structures, e.g. as is described in WO2014/075937A1, the contents of which are incorporated herein by reference.

When a storage container 106 stored in one of the columns 105 disclosed in FIG. 1 is to be accessed, one of the container handling vehicles 201,301 is instructed to retrieve the target storage container 106 from its position and transport it to the drop-off port column 119. This operation involves moving the container handling vehicle 201,301 to a location above the storage column 105 in which the target storage container 106 is positioned, retrieving the storage container 106 from the storage column 105 using the container handling vehicle's 201,301 lifting device (not shown), and transporting the storage container 106 to the drop-off port column 119. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port column 119, or with one or a plurality of other cooperating container handling vehicles. Alternatively, or in addition, the automated storage and retrieval system 1 may have container handling vehicles specifically dedicated to the task of temporarily removing storage containers from a storage column 105. Once the target storage container 106 has been removed from the storage column 105, the temporarily removed storage containers can be repositioned into the original storage column 105. However, the removed storage containers may alternatively be relocated to other storage columns.

When a storage container 106 is to be stored in one of the columns 105, one of the container handling vehicles 201,301 is instructed to pick up the storage container 106 from the pick-up port column 120 and transport it to a location above the storage column 105 where it is to be stored. After any storage containers positioned at or above the target position within the storage column stack 107 have been removed, the container handling vehicle 201,301 positions the storage container 106 at the desired position. The removed storage containers may then be lowered back into the storage column 105 or relocated to other storage columns.

For monitoring and controlling the automated storage and retrieval system 1, e.g. monitoring and controlling the location of respective storage containers 106 within the framework structure 100, the content of each storage container 106; and the movement of the container handling vehicles 201,301 so that a desired storage container 106 can be delivered to the desired location at the desired time without the container handling vehicles 201,301 colliding with each other, the automated storage and retrieval system 1 comprises a control system 500 which typically is computerized and which typically comprises a database for keeping track of the storage containers 106.

In addition to the prior art container handling vehicles 201,301 described above, other container handling vehicles designed to perform digging operations more efficiently are known.

Prior art vehicles for improved digging operations are disclosed in WO 2019/101366 A1 and WO 2019/101725 A1.

The object of the present invention is to provide a container handling vehicle having an improved efficiency in performing digging operations in a storage system as described above.

SUMMARY OF THE INVENTION

The present invention is defined by the attached claims and in the following:

In a first aspect, the present invention provides a container handling vehicle for lifting a storage container from an underlying framework structure, wherein the vehicle comprises a vehicle body and a container lifting assembly for lifting the storage container;

the vehicle body comprises a wheeled base, a support and at least one cantilevered section; wherein the wheeled base comprises a first set of wheels, arranged on opposite sides of the vehicle body, for moving the vehicle along a first direction on a rail grid at a top level of the underlying framework structure, and a second set of wheels arranged on other opposite sides of the vehicle body, for moving the vehicle along a second direction on the rail grid, the second direction being perpendicular to the first direction; and the support comprises a lower end connected to the wheeled base and an upper portion connected to the cantilevered section;

the container lifting assembly comprises a lifting frame and a plurality of lifting bands, the lifting frame being for releasable connection to a storage container and suspended from the cantilevered section by the lifting bands, such that the lifting frame may be raised or lowered relative to the cantilevered section;

the cantilevered section extends laterally from the upper portion of the support and is arranged to rotate horizontally about a vertical axis relative to the wheeled base between a first position and a second position, in the first position, the cantilevered section extends beyond the wheeled base, such that the lifting frame may retrieve or deliver a storage container from/to a storage column of the framework structure, and in the second position the cantilevered section extends in an opposite direction relative to the direction in the first position, wherein the support holds the cantilevered section above the wheeled base at a height corresponding to a height of multiple storage containers, such that a vertical distance between the lifting frame, when the lifting frame is in an upper position, and the lower end of the support is larger than the height of two storage containers stacked on top of each other.

In other words, the vertical distance between the lifting frame, when the lifting frame is in an upper position, and the level of the lower end of the support may be larger than the height of two storage containers stacked on top of each other.

In the second position, the cantilevered section may extend beyond the wheeled base or above a container carrier section of the wheeled base.

In an embodiment, a vertical distance between the lifting frame, when the lifting frame is in an upper position, and a lower level of the first set of wheels may be larger than the height of two storage containers stacked on top of each other.

In an embodiment, a vertical distance between the lifting frame, when the lifting frame is in an upper position, and a top surface, or topside, of the wheel base unit may be larger than the height of two storage containers stacked on top of each other.

In an embodiment, the vertical distances may be larger than the height of three storage containers stacked on top of each other.

In an embodiment of the vehicle, the vertical distance may be at least 660 mm, such that the lifting frame is positionable above a stack of at least two storage containers when each storage container has a height of 330 mm and a bottom of the stack is supported at a level corresponding to the level of the lower end of the support.

In an embodiment of the vehicle, the lifting frame may be positionable above a stack of at least two storage containers when a bottom of the stack is supported at a level corresponding to the level of the lower end of the support, and the cantilevered section is in the second position.

In an embodiment of the vehicle, the vertical distance between the lifting frame, when the lifting frame is in an upper position, and the lower end of the support may be larger than the height of three storage containers stacked on top of each other.

In an embodiment of the vehicle, the height of the support may be at least twice, preferably at least three times, the height of the wheeled base.

In an embodiment of the vehicle, the horizontal periphery of the support may be arranged to be within the horizontal periphery of the wheeled base during rotation of the cantilevered section. This feature prevents the support from extending above any grid cell being adjacent to a grid cell occupied by the wheeled base when the vehicle is arranged on a rail grid. In other words, the support, or the periphery of the support, may be arranged to not extend further in the first or second direction than the second and first set of wheels, respectively, during rotation of the cantilevered section.

The horizontal periphery of the support may have a maximum length equal to or shorter than the width of the wheeled base.

In an embodiment of the vehicle, the first set of wheels is displaceable in a vertical direction between a first position, wherein the first set of wheels allows movement of the vehicle along the first direction, and a second position, wherein the second set of wheels allows movement of the vehicle along the second direction.

In an embodiment of the vehicle, the first set of wheels may comprise a first pair of wheels and a second pair of wheels arranged on opposite sides of the vehicle body, and the second set of wheels may comprise a third pair of wheels and a fourth pair of wheels arranged on other opposite sides of the vehicle body. In other words, the wheeled base may feature four sides, and each side may feature at least two wheels. The four sides of the wheeled base may form a substantially square or rectangular horizontal periphery.

In an embodiment of the vehicle, the horizontal periphery of the support may be arranged to be within the horizontal periphery of the wheeled base during rotation of the cantilevered section, and the horizontal periphery of the wheeled base may be defined by four vertical planes, wherein each plane comprises the outer vertical faces of the wheels in one of the first, second, third or fourth pair of wheels. The horizontal periphery of the wheeled base may also be defined by four horizontal lines intersecting the outer vertical surfaces of the wheels in the first and second set of wheels.

In an embodiment of the vehicle, the lower end of the support is rotationally connected to the wheeled base by a slewing ring. The slewing ring may have an outer diameter slightly smaller or corresponding to the width of the wheeled base.

In an embodiment of the vehicle, the support is a column, i.e. a support column. The horizontal periphery of the support may be circular, elliptic or polygonal.

In an embodiment of the vehicle the support comprises a sidewall. The sidewall may be a peripheral sidewall and may define the horizontal periphery of the support.

In an embodiment of the vehicle, the container lifting assembly may feature a lifting frame guide assembly comprising a first guide device and a cooperating second guide device;

the first guide device is provided on the lifting frame; and the second guide device is slidably connected to the vehicle body via at least one vertical rail, such that the second guide device can move in a vertical direction relative to the support;

the first guide device and the second guide device are arranged to interact with each other when the lifting frame is adjacent the at least one vertical rail, such that horizontal movement of the lifting frame relative to the cantilevered section is restricted.

In an embodiment of the vehicle, the vertical rail extends from a lower level of the support towards the cantilevered section, such that the second guide device may move in a vertical direction between a lower position adjacent to the support and an upper position in which the lifting frame docks with the cantilevered section.

In an embodiment of the vehicle, the first guide device comprises at least one first guide element and the second guide device comprises at least one second guide element, wherein the first guide element and the second guide element have complementary shapes such that horizontal movement between the first guide element and the second guide element is restricted when the first guide element interacts with the second guide element. In other words, the first guide element and the second guide element have complementary shapes such that horizontal movement between the first guide device and the second guide device is restricted when the first guide element interact with the second guide element.

In an embodiment of the vehicle, the second guide device may be slidably connected to the sidewall of the support by the at least one vertical rail.

In an embodiment of the vehicle, the second guide device may be slidably connected to the sidewall, such that horizontal movement of the second guide element relative to the sidewall is restricted or prevented.

In an embodiment of the vehicle, the vertical rail extends from a lower position on the sidewall towards the cantilevered section, such that the second guide device may move in a vertical direction between a lower position adjacent to the sidewall and an upper position in which the lifting frame is in contact and/or docked with the cantilevered section.

In an embodiment of the vehicle, a section of the second guide device is arranged between the cantilevered section and the lifting frame.

In an embodiment of the vehicle, one of the first guide device and the second guide device comprises at least one guide element being a pin, protrusion, recess, or hole and the other one of the first guide device and the second guide device comprises a complementary guide element for interacting with the at least one pin, protrusion, recess or hole, such that horizontal movement of the first guide device relative to the second guide device is restricted.

In an embodiment of the vehicle, the first guide device comprises two first guide elements being horizontally spaced, and the second guide device comprises two second guide elements, each of the first guide elements arranged to interact with a corresponding second guide element.

In an embodiment of the vehicle, one of the first guide device and the second guide device comprises at least one pin or vertical recess, and one of the first guide device and the second guide device comprises a cooperating hole or protrusion, respectively, such that horizontal movement of the first guide device relative to the second guide device is restricted.

In an embodiment of the vehicle, one of the first guide device and the second guide device comprises a spring arranged to dampen the interaction between the first guide device and the second guide device in a vertical direction.

In an embodiment of the vehicle, the wheeled base comprises a container carrier section having a support surface upon which a storage container may be arranged, and the cantilevered section extends above the container carrier section in the second position, such that the lifting frame may retrieve or deliver a storage container from/to the surface of the container carrier section. The container carrier section may comprise a storage container support. The container carrier support may be configured to restrict horizontal movement of a storage container in at least three perpendicular horizontal directions. The storage container support may comprise at least two vertical corner sections, each corner section configured to accommodate a corner of a storage container.

In an embodiment of the vehicle, the support surface of the container carrier section may be arranged at a level substantially corresponding to the level of the lower end of the support. In other words, the support surface of the container carrier section is arranged at a level allowing the lifting frame to be arranged above a stack of at least two storage containers arranged on the support surface of the container carrier section.

In a second aspect, the present invention provides a vehicle assembly comprising a first container handling vehicle according to any embodiment of the first aspect and a second container handling vehicle, wherein the second container handling vehicle comprises a wheeled base and a container carrier arranged on top of the wheeled base, the wheeled base of the second container handling vehicle being positionable adjacent to the wheeled base of the first container handling vehicle, such that the lifting frame of the first container handling vehicle is positionable above the container carrier of the second container handling vehicle.

In a third aspect, the present invention provides a storage system comprising a framework structure and a first container handling vehicle according to any of the preceding claims, wherein the framework structure comprises multiple storage columns, in which storage containers may be stored stacked on top of one another in vertical stacks, and the first container handling vehicle is operated on a rail grid at a top level of the framework structure for retrieving storage containers from, and storing storage containers in, the storage columns, and for transporting the storage containers horizontally across the rail grid.

In an embodiment, the storage system comprises a second container handling vehicle operated on the rail grid for transporting storage containers horizontally across the rail grid and optionally for retrieving storage containers from, and storing storage containers in, the storage columns, wherein the cantilevered section of the first container handling vehicle is arranged at a level allowing the second container handling vehicle to be positioned under the lifting frame of the first container handling vehicle when the lifting frame is in an uppermost position lifting a storage container.

The second, or second type of, container handling vehicle may comprise a wheeled base and at least a container lifting assembly for retrieving a storage container from a storage column or a container carrier for accommodating a storage container on top of the wheeled base. In other words, the second container handling vehicle may comprise a vehicle body, comprising a first set of wheels, arranged on opposite sides of the vehicle body, for moving the vehicle along a first direction on a rail grid at a top level of the underlying framework structure, and a second set of wheels arranged on other opposite sides of the vehicle body, for moving the vehicle along a second direction on the rail grid, the second direction being perpendicular to the first direction, and at least a container lifting assembly for retrieving a storage container from a storage column or a container carrier for accommodating a storage container on top of the vehicle body.

In an embodiment of the storage system, the rail grid forms a plurality of grid cells, each grid cell provides access to an upper end of a storage column, and the second container handling vehicle may be positioned at any grid cell adjacent to the wheeled base of the first container handling vehicle during rotation of the cantilevered section.

In other words, the second container handling vehicle may be positioned at any grid cell being adjacent to a grid cell occupied by the wheeled base of the first container handling vehicle. The wheeled base of the first container handling vehicle may occupy one or two grid cells, i.e. the horizontal periphery of the wheeled base fits within one or two adjacent grid cells.

In an embodiment of the storage system, the cantilevered section of the first container handling vehicle may be rotatable between a first position and a second position; in the first position, the cantilevered section extends beyond the wheeled base, such that the lifting frame is arranged directly above a first storage column adjacent to the wheeled base, and in the second position the cantilevered section extends in an opposite direction relative to the direction in the first position.

In an embodiment of the storage system, the second container handling vehicle may be configured to be positioned directly above the first storage column when the cantilevered section of the first container handling vehicle is in the first position, such that the second container handling vehicle is positionable to retrieve a storage container from the first storage column or receive a storage container from the first container handling vehicle.

In an embodiment of the storage system, the cantilevered section may be arranged directly above any of a second storage column adjacent to the wheeled base, a container carrier section of the wheeled base or a container carrier of a second container handling vehicle, when in the second position.

In an embodiment of the storage system, the second container handling vehicle may be configured to be positioned under the lifting frame of the first container handling vehicle when the lifting frame is connected to a storage container.

In a fourth aspect, the present invention provides a method of retrieving a target storage container from a storage system according to any embodiment of the third aspect, the method comprising the steps of:
a. identifying a first storage column in which the target storage container is stored;
b. moving the first container handling vehicle upon the rail grid to a position wherein the wheeled base is adjacent to the first storage column;
c. arranging the cantilevered section in a first position, wherein the cantilevered section is arranged directly above the first storage column;
d. retrieving a non-target storage container from a stack of storage containers in the first storage column by use of the lifting frame;

e. rotating the cantilevered section to a second position, wherein the cantilevered section extends in an opposite direction relative to the direction in the first position;
f. placing the non-target storage container at a second storage column adjacent to the wheeled base, on a container carrier of the wheeled base or on a second container handling vehicle comprising a container carrier;
g. rotating the cantilevered section to the first position;
h. repeating steps d-f and optionally step g until the target storage container is the uppermost storage container in the first storage column; and
i. retrieving the target storage container from the first storage column by use of the lifting frame; or
j. retrieving the target storage container from the first storage column by use of a second container handling vehicle (301) comprising a container lifting assembly.

In an embodiment of the method, step e is initiated before the lifting frame is in the upper position.

In an embodiment of the method, step h may create a stack of a plurality of non-target storage containers stacked on top of each other, wherein at least the upper non-target storage container is arranged above the upper level of the rail grid.

In an embodiment of the method, step h may create a stack of a plurality of non-target storage containers stacked on top of each other, wherein the retrieved non-target storage container(s) is/are arranged above the upper level of the rail grid and carried by a container handling vehicle.

In an embodiment of the method, the target storage container retrieved in step i is subsequently lowered onto a container carrier of a second container handling vehicle arranged under the cantilevered section.

In a fifth aspect, the present invention provides a method of retrieving a plurality of storage containers from a storage system according to any embodiment of the third aspect, the method comprising the steps of:
a. identifying a storage column in which the plurality of storage containers are stored;
b. moving the first container handling vehicle upon the rail grid to a position wherein the wheeled base is adjacent to the storage column;
c. arranging the cantilevered section in a first position, wherein the lifting frame is arranged directly above the storage column;
d. retrieving one of the plurality of storage containers from the storage column by use of the lifting frame;
e. rotating the cantilevered section to a second position, wherein the cantilevered section extends in an opposite direction relative to the direction in the first position;
f. placing the storage container on a container carrier section of the wheeled base or on a container carrier of a second container handling vehicle;
g. rotating the cantilevered section to the first position; and
h. repeating steps d-f and optionally step g until the plurality of storage containers are retrieved as a stack of storage containers stacked on top of each other.

In one embodiment, the method according to the fifth aspect comprises a step of
i. moving the first or second container handling vehicle carrying the stack of storage containers to a position wherein the stack of storage containers are retrieved from the respective container handling vehicle.

In a sixth aspect, the present invention provides a method of storing a plurality of storage containers in a storage system according to any embodiment of the third aspect, the method comprising the steps of:

a. placing the plurality of storage containers, as a stack of storage containers stacked on top of each other, on a container carrier section of the wheeled base of the first container handling vehicle or on a container carrier of a second container handling vehicle;

b. identifying a storage column in which the plurality of storage containers are to be stored;

c. moving the first container handling vehicle upon the rail grid to a position wherein the wheeled base is adjacent to the storage column;

d. arranging the cantilevered section in a second position, wherein the lifting frame is arranged directly above the container carrier section or the container carrier;

e. retrieving one of the plurality of storage containers from the stack of storage containers on the container carrier section or the container carrier by use of the lifting frame;

f. rotating the cantilevered section to a first position, wherein the cantilevered section extends in an opposite direction relative to the direction in the second position, wherein the lifting frame is arranged directly above the storage column;

g. storing the storage container in the storage column, i.e. by the steps of lowering the lifting frame into the storage column, releasing the storage container from the lifting frame and raising the lifting frame;

h. rotating the cantilevered section to the second position; and i. repeating steps d-g and optionally step h until the plurality of storage containers are stored in the storage column.

The term "horizontal movement" is intended to comprise both lateral and rotational horizontal movement.

BRIEF DESCRIPTION OF THE DRAWINGS

Embodiments of the invention is described in detail by reference to the following drawings:

FIGS. 5-14 are perspective views and details of a first exemplary container handling vehicle according to the invention.

FIGS. 15-20 are perspective views of a second exemplary container handling vehicle according to the invention.

FIGS. 23a and 23b are perspective view of a fourth container handling vehicle according to the invention.

DETAILED DESCRIPTION OF THE INVENTION

Figure 1:
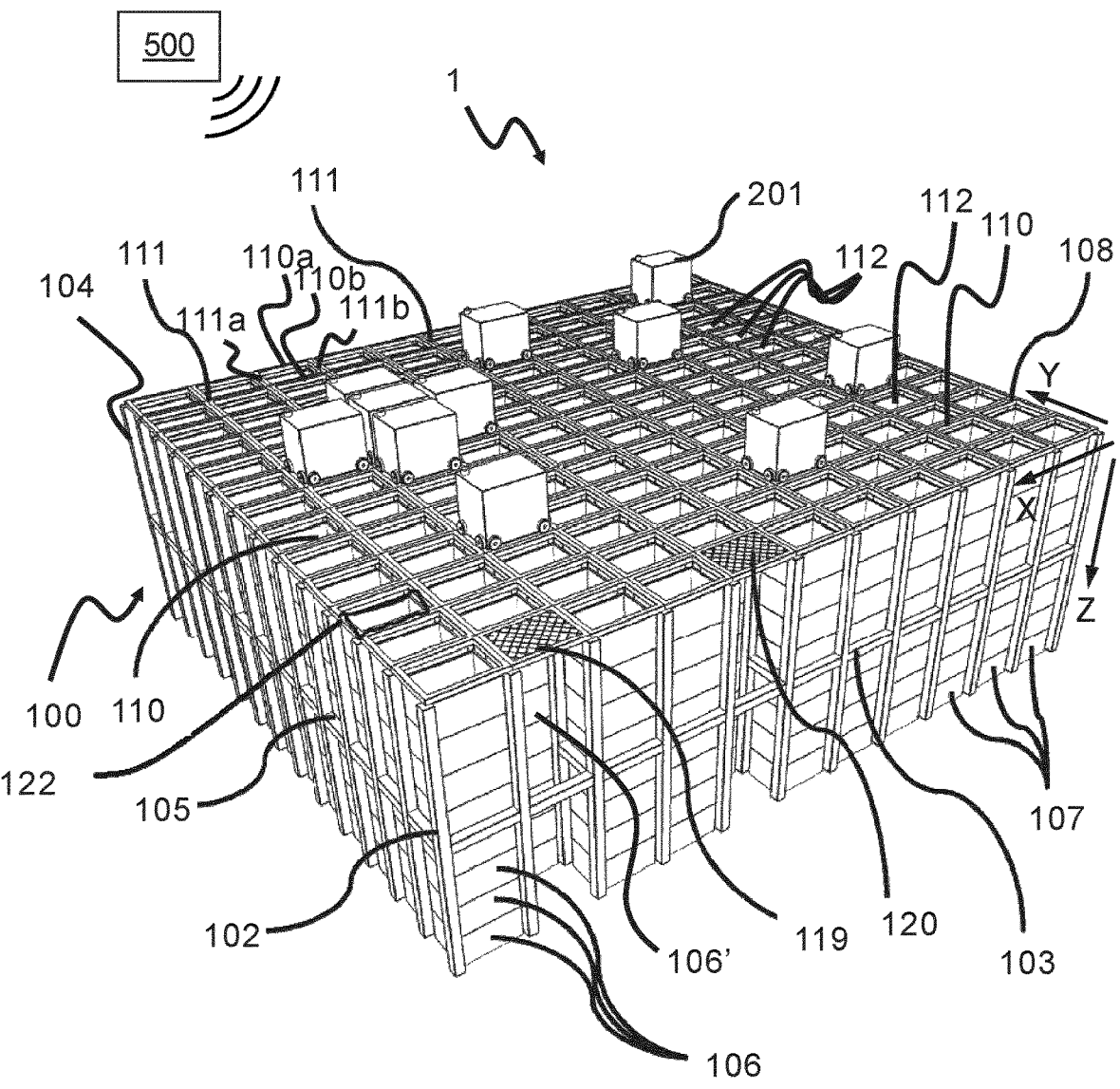
FIG. 1 is a perspective view of a framework structure of a prior art automated storage and retrieval system.
Figure 2:
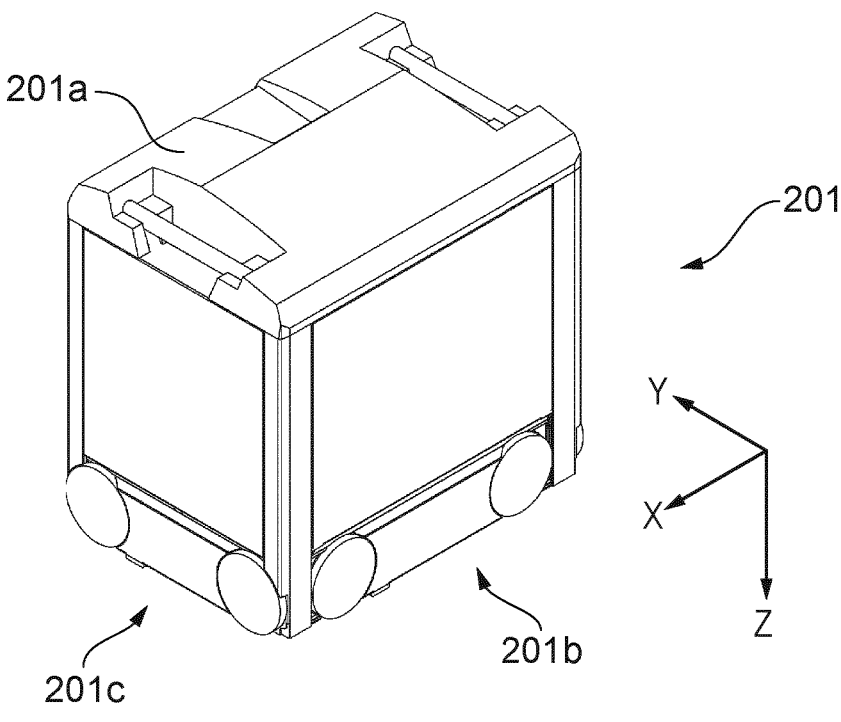
FIG. 2 is a perspective view of a prior art container handling vehicle having a centrally arranged cavity for carrying storage containers therein.
Figure 3:
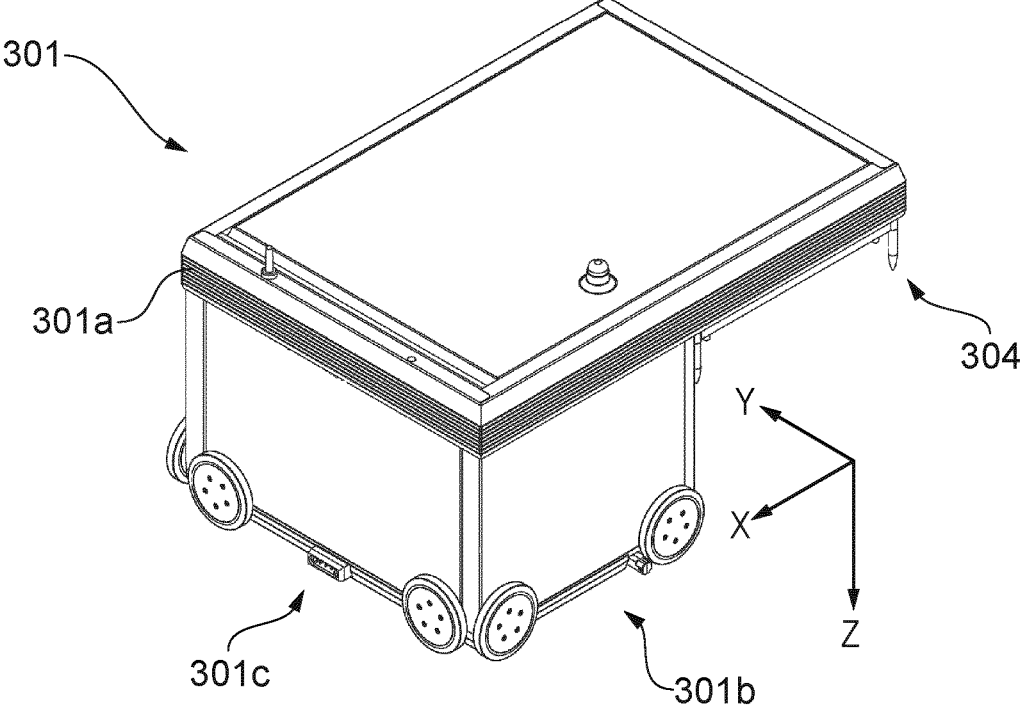
FIG. 3 is a perspective view of a prior art container handling vehicle having a cantilevered section for carrying storage containers underneath.
Figure 4:
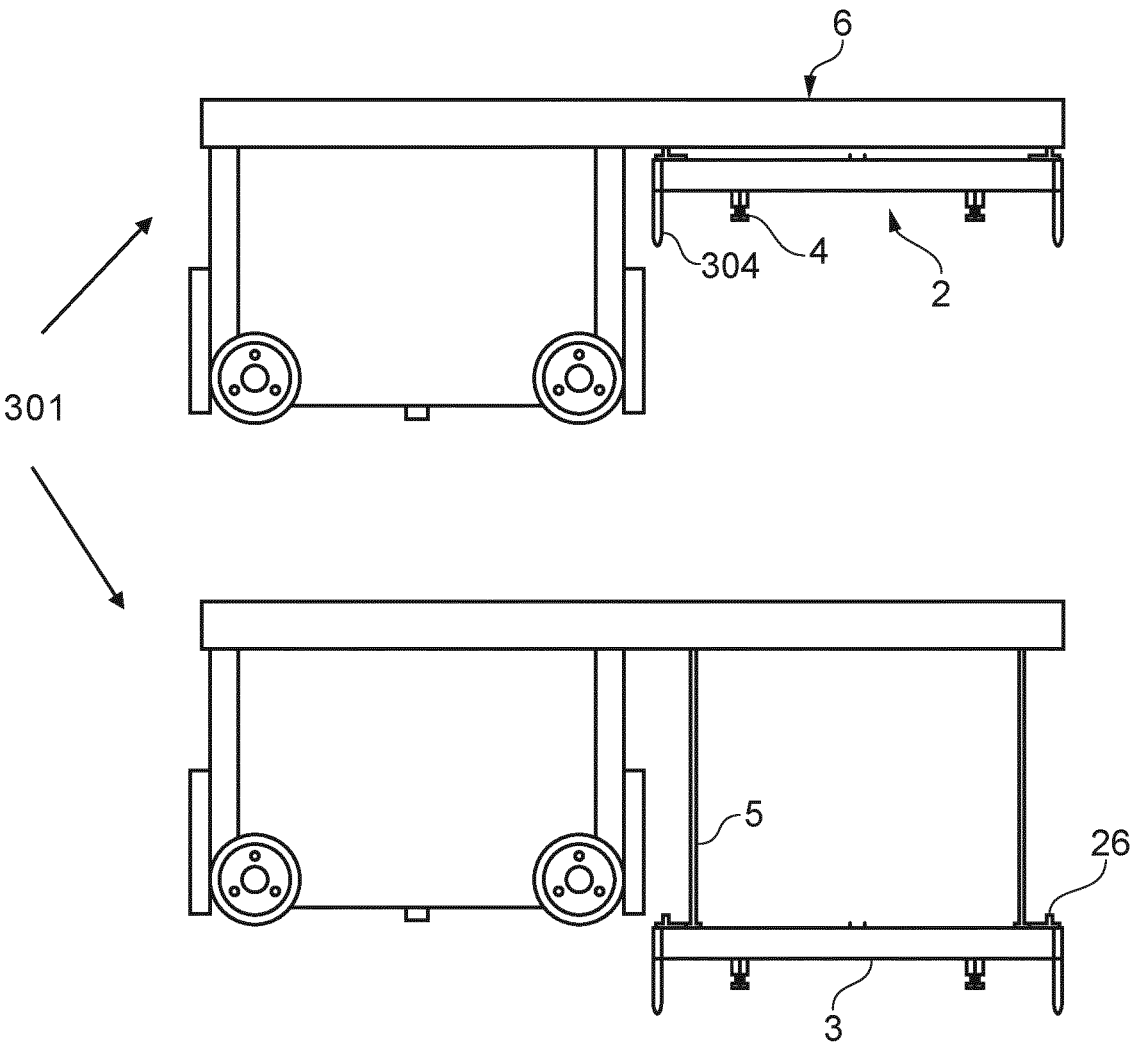
FIG. 4 are side views of the container handling vehicle in FIG. 3, wherein a lifting device is shown.
Figure 5:
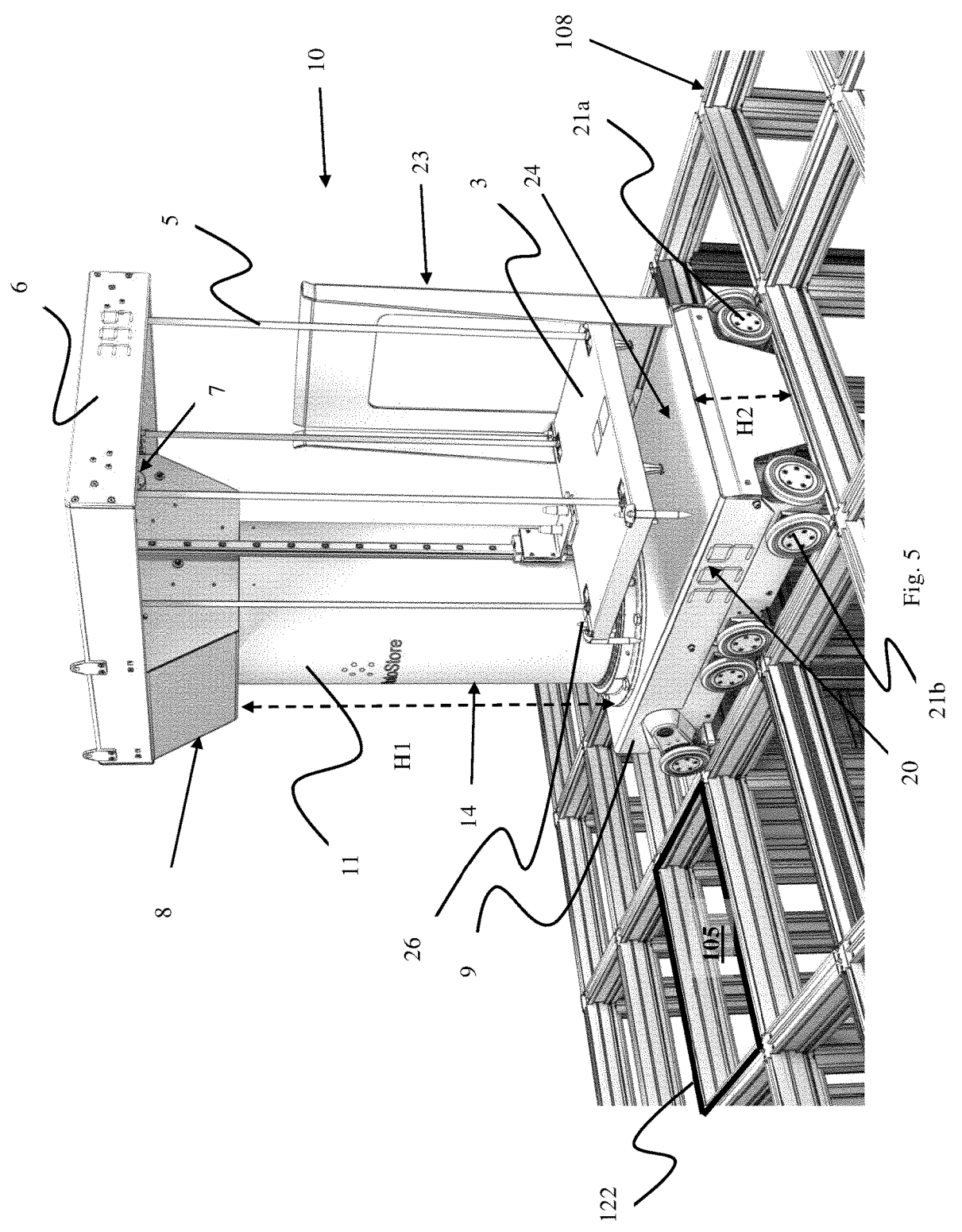

In the following, embodiments of the invention will be discussed in more detail with reference to the appended drawings. However, the drawings are not intended to limit the invention to the subject-matter depicted in the drawings.

The present invention concerns a remotely operated container handling vehicle for use in an automated storage system featuring at least one rail system, e.g. a rail system 108 as discussed for the prior art storage system disclosed in FIG. 1.

A first exemplary embodiment of a container handling vehicle 10 according to the invention is shown in FIGS. 5-14. The vehicle 10 is for lifting storage containers 106 from an underlying framework structure 100. The framework structure may for instance be a structure as shown in FIG. 1 comprising a plurality of storage columns in which storage containers are stacked on top of each other.

The vehicle comprises a vehicle body 8 and a container lifting assembly 3,5 for lifting a storage container 106. The vehicle body 8 features a wheeled base 9 having a container carrier section 20 having a support surface 24 upon which a storage container 106 may be arranged, a support column 11 (i.e. a support) and at least one cantilevered section 6.

The wheeled base 9 has a first set of wheels 21a arranged on opposite sides of the vehicle body 8 and a second set of wheels 21b arranged on the other opposite sides of the vehicle body 8. The first set of wheels 21a is for moving the vehicle 10 along a first direction X on the rail grid 108 at a top level of the underlying framework structure 100, and the second set of wheels is for moving the vehicle 10 along a second direction Y on the rail grid 108, the second direction Y being perpendicular to the first direction X. The wheeled base 9 has at least one electric motor for driving the first and second set of wheels. Suitable wheeled bases are described in for instance WO 2019/238703 A1. The wheeled base 9 of the first exemplary embodiment may for instance be made up of two connected wheel base units as disclosed in WO 2019/238703 A1.

The support column 11 has a lower end 17 connected to a top side of the wheeled base 9 and an upper portion 18 connected to the cantilevered section 6. In this embodiment, the lower end 17 of the support column 11 is rotationally connected to the wheeled base 9 by a slewing ring 30. The slewing ring may have an outer diameter corresponding to, or being slightly smaller than, the width of the wheeled base 9.

The container lifting assembly comprises a lifting frame 3 and four lifting bands 5. The lifting frame 3 configured to releasably connect to a storage container 106 and suspended from the cantilevered section 6 by the lifting bands 5. The lifting bands are connected to a lifting shaft assembly 7, such that the lifting frame 3 may be raised or lowered relative to the cantilevered section 6.

The cantilevered section 6 extends laterally from the upper portion 18 of the support column 11 and is arranged to rotate horizontally about a vertical axis relative to the wheeled base 9 between a first position and a second position. In the first position, the cantilevered section 6 extends beyond the wheeled base 9, such that the lifting frame 3 may retrieve or deliver a storage container 106 from/to a storage column 105 of the framework structure 100, see e.g. FIG. 9. In the second position, the cantilevered section 6 extends in an opposite direction relative to the direction in the first position, such that the lifting frame may lower a storage container onto, or retrieve a storage container from, the container carrier section 20.

Figure 6:
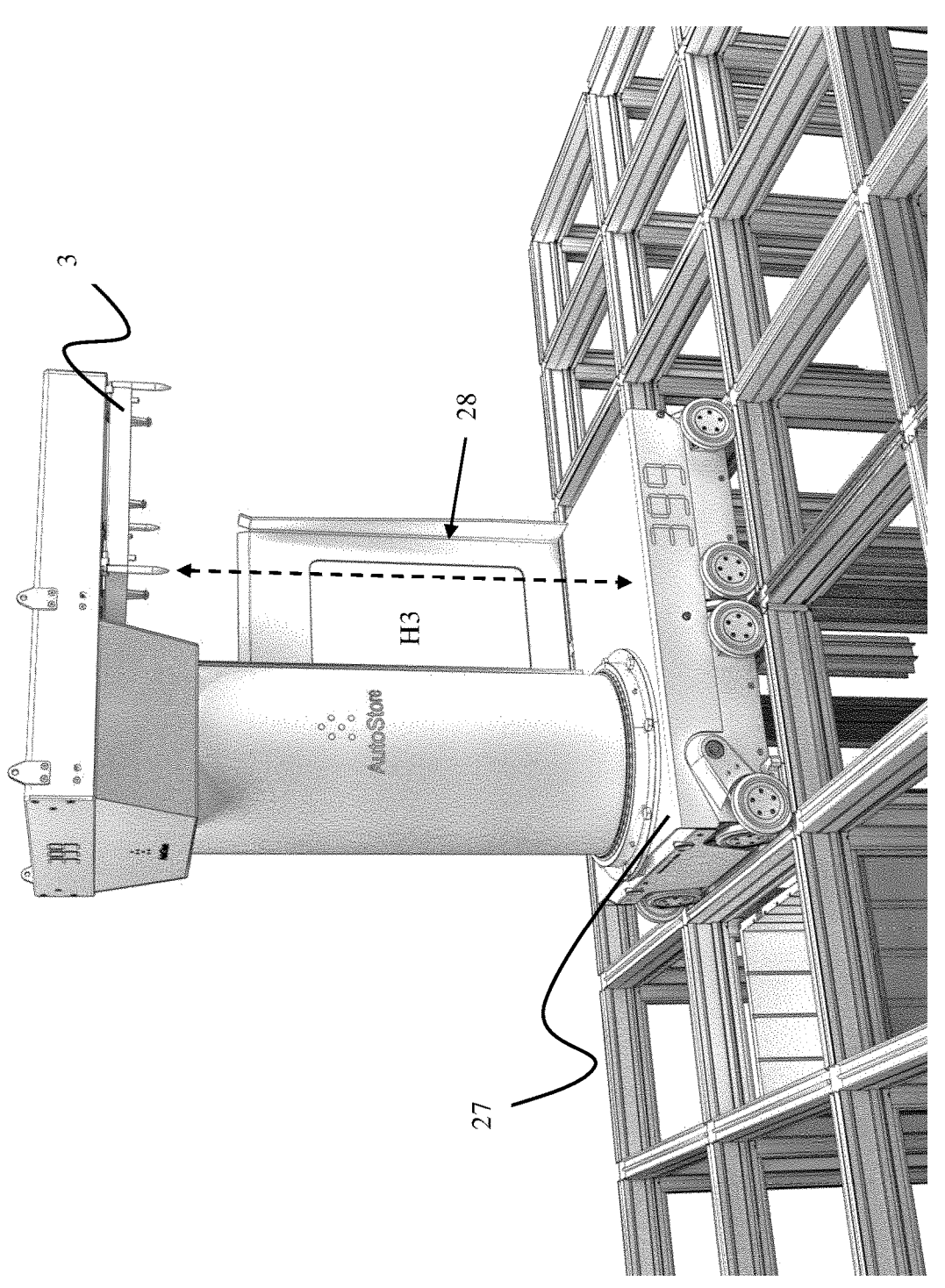
Figure 7:
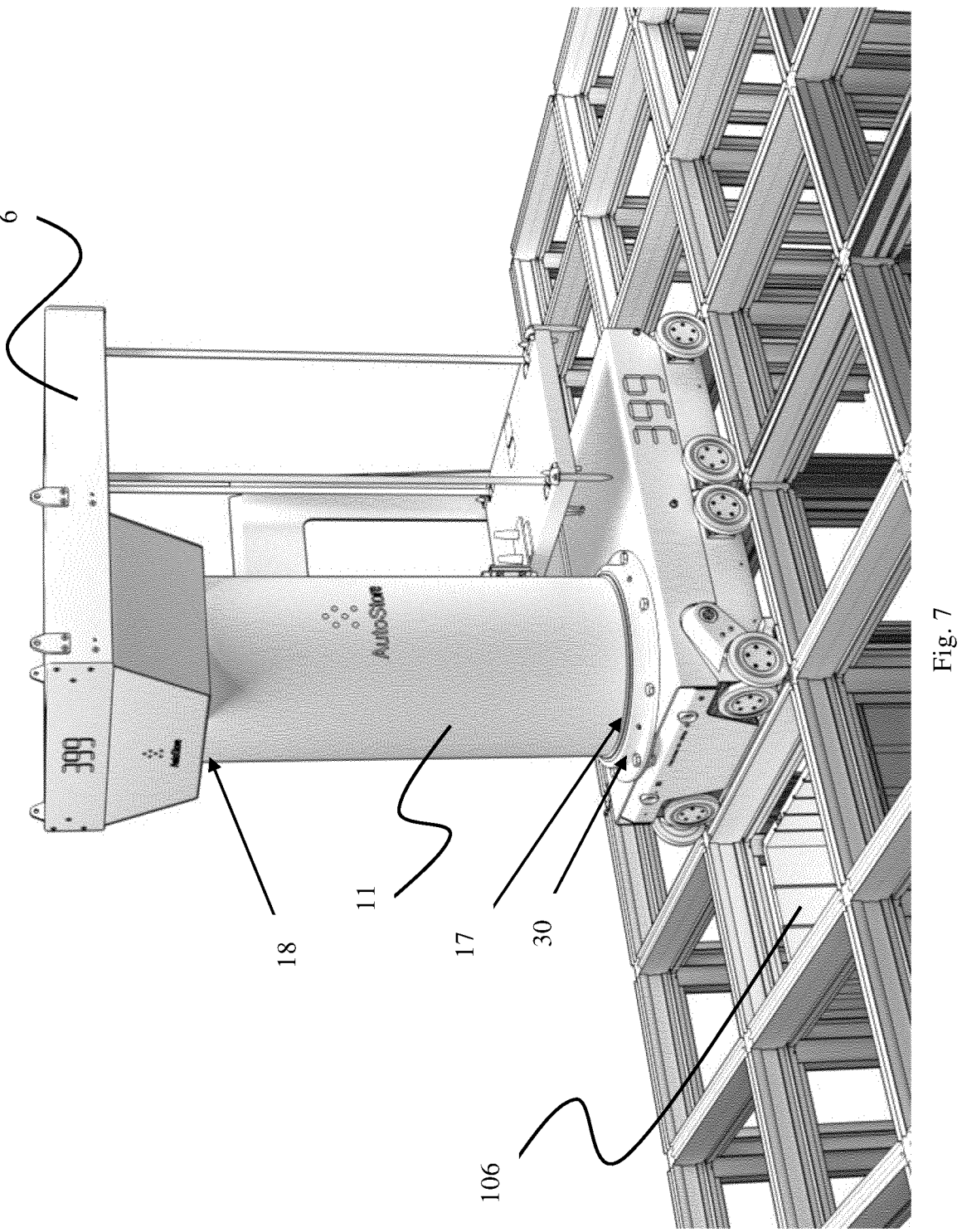
Figure 8:
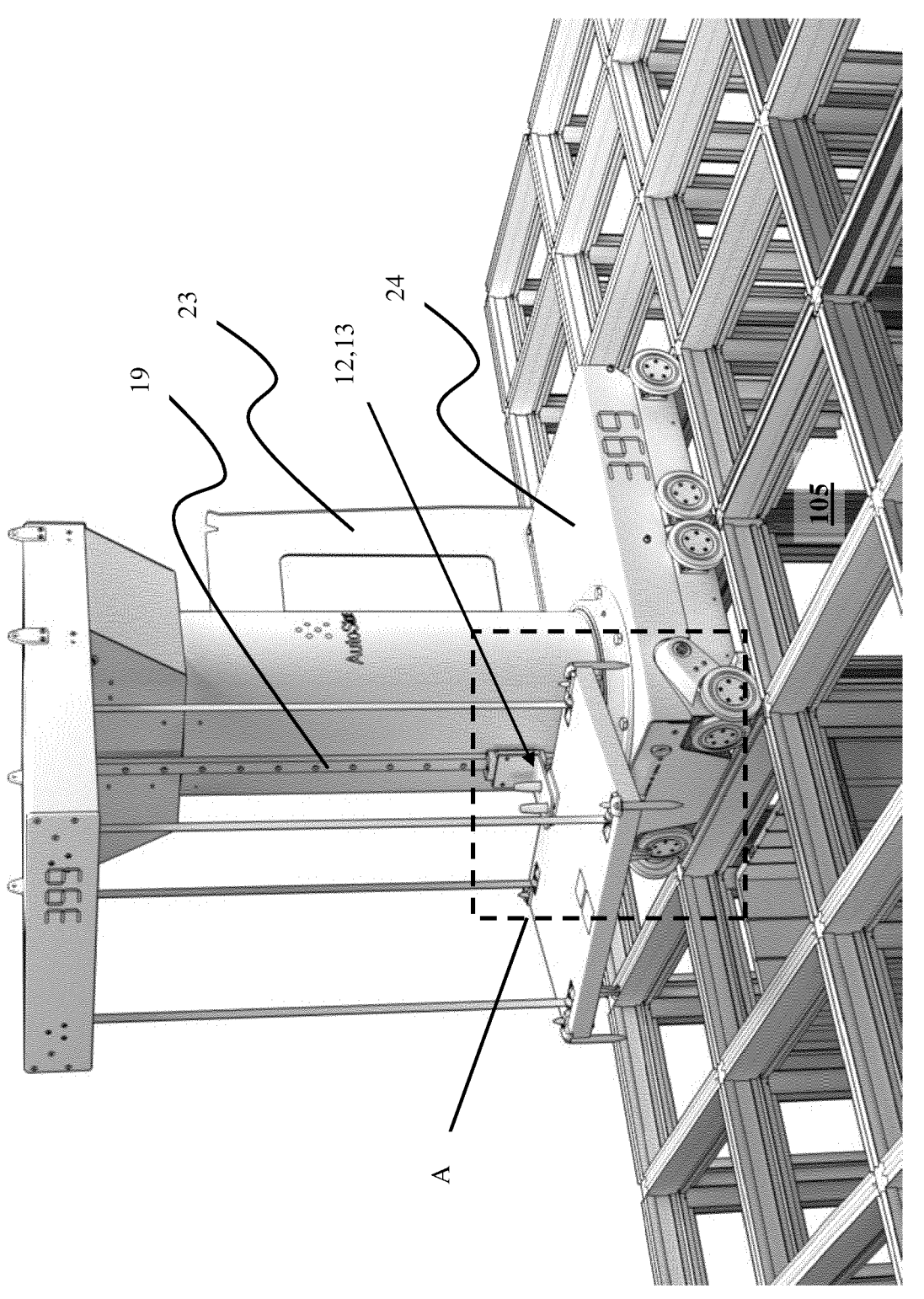

The support column 11 holds the cantilevered section 6 above the wheeled base 9 at a height corresponding to a height of multiple storage containers, such that a vertical distance H3, see FIG. 6, between the lifting frame 3, when the lifting frame 3 is in an upper position, and the lower end 17 of the support column 11 is larger than the height of two storage containers stacked on top of each other. The vertical distance H3 may alternatively be defined as the distance between the lifting frame 3 and a top side 27 of the wheeled base 9. In the first embodiment, the level of the support surface 24 is about equal to the level of the lower end of the support column, and the vertical distance to the lifting frame allows a plurality of storage containers to be stacked on top of each other while arranged on the support surface. The container carrier section 20 features a vertical storage container support 23 to provide stability to storage containers stacked on the support surface. The storage container support has two vertical corner sections 28 for supporting the corresponding corners of a storage container 106 and for guiding the vertical movement of the lifting frame 3 and any storage container 106 connected thereto.

In a storage system suitable for the container handling vehicle 10, the height of a storage container is commonly 220 mm, 330 mm or 425 mm. Thus, the vertical distance H3 is at least 440 mm, but preferably at least 660 mm to allow two storage containers having a height of 330 mm to be stacked on top of each other on the support surface 24 by use of the lifting frame 3. In the embodiment shown in FIGS. 5-14, the vertical distance H3 is slightly more than 990 mm to allow stacking of three storage containers on top of each other on the container carrier 20, see FIG. 13.

To obtain the desired function of the container handling vehicle 10, the height H1 of the support 11 is preferably at least twice the height H2 of the wheeled base 9.

The horizontal periphery of the support column 11, i.e. the boundary of a peripheral sidewall 14, is arranged to be within the horizontal periphery of the wheeled base 9 during rotation of the cantilevered section 6. In this manner, a second type of container handling vehicle 301, see e.g. FIG. 13, may move on grid cells 122, see FIG. 5, being adjacent to the exemplary container handling vehicle 10 without interfering with the operation.

As in the prior art vehicles 201, 301, the lifting frame 3 features combined guiding pins/contact sensors 26 arranged on a top side of the lifting frame 3. The guiding pins/contact sensors 26 interact with the cantilever section 6 when the lifting frame is fully raised, i.e. is in an upper position, and restrain horizontal movement between the lifting frame 3 and the cantilever section 6.

To restrict horizontal movement of the lifting frame 3 during rotation of the cantilevered section and during movement of the container handling vehicle 10 on the rail grid 108, the container handling vehicle 10 features a lifting frame guide assembly having a first guide device 12 and a cooperating second guide device 13, see FIGS. 8-10 and 23*a-b*. The first guide device 12 features at least one first guide element, in this case being two vertical pins 15, and the second guide device 13 features at least one second guide element, in this case being two holes 16. The first and second guide elements, e.g. the vertical pins 15 and the holes 16, have complementary shapes. The complimentary shapes are designed to restrict horizontal movement, i.e. both lateral and rotational horizontal movement, between the first and the second guide element when the guide elements interact with each other.

The second guide device 13 of the lifting frame guide assembly may be described as a carriage (e.g. made up of plate sections 22*a*,22*b*, see below) slidably connected to the support column 11 or the peripheral sidewall 14, e.g. via at least one rail 19. The carriage couples with the lifting frame 3 via the first guide device 12 and moves with the lifting frame 3 as the lifting frame 3 moves from a lower position up to where the lifting frame 3 docks with the cantilever section 6.

Figure 9:
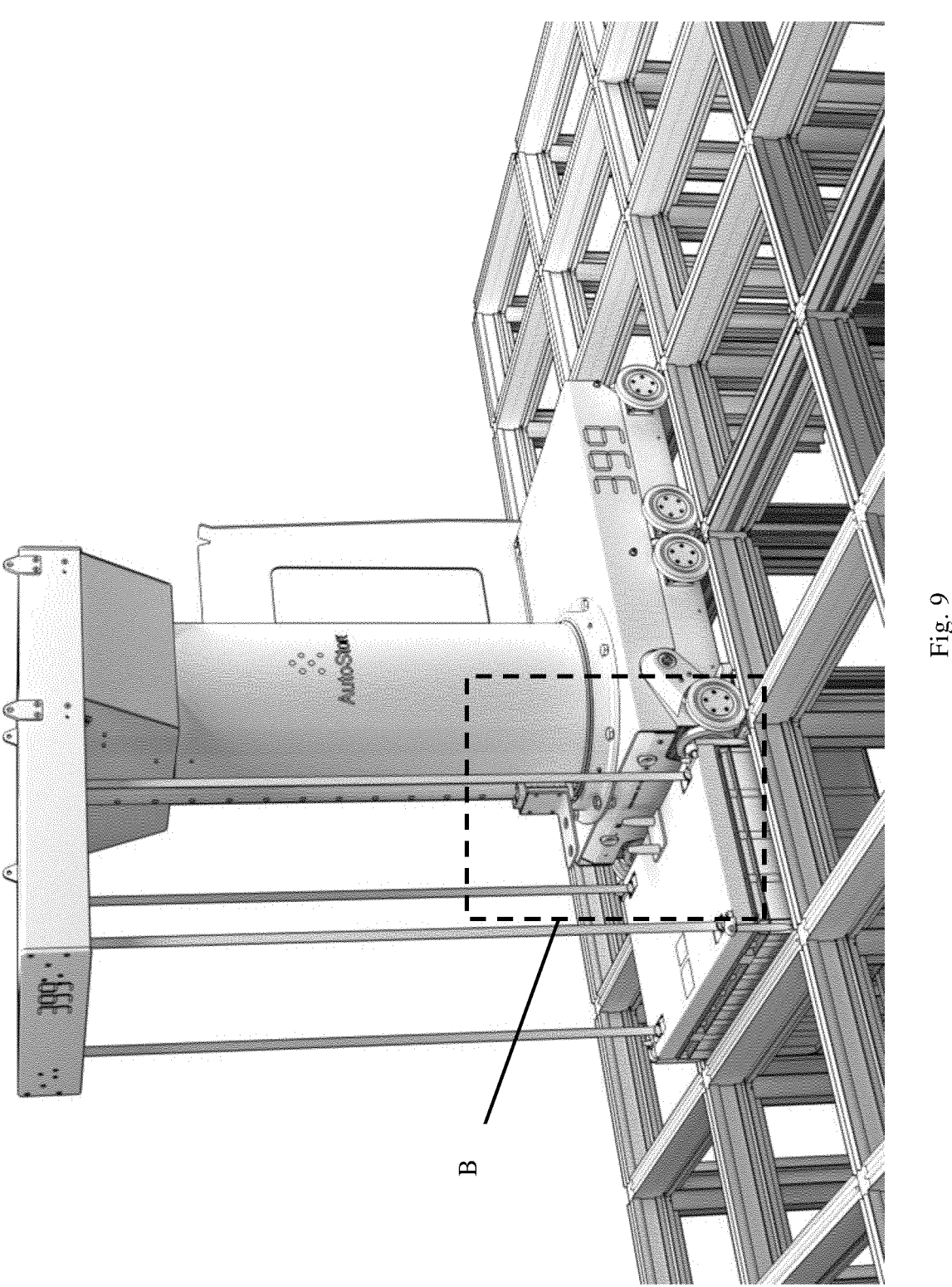

The complimentary shapes of the vertical pins 15 and the holes 16 serve to locate the first guide device 12 and the second guide device 13 together as the lifting frame 3 is raised and emerges from the storage grid, e.g. from a storage column 105 as shown in FIG. 9. In further embodiments, the complimentary shapes may be of any shape or form provided the first and second guide device are restrained from horizontal movement relative to each other when located together. When positioned within the storage column 105, horizontal movement of the lifting frame 3 is restricted by the inner periphery of the storage column 105. When the lifting frame 3 emerges from the storage column 105, horizontal restraint of the lifting frame 3 is provided by the second guide device 13 locking down the horizontal movement through connection with the first guide device 12.

A part of the second guide device 13 featuring the two holes 16 extends laterally from the sidewall 14 and at a position between the cantilevered section 6 and the lifting frame 3. In this embodiment, the second guide device is made up of a first plate section 22*a* and a second plate section 22*b*. The first plate section 22*a* is connected to the rail 19, and the second plate section 22*b* features the two holes 16 and extends from an upper end of the first plate section 22*a* and between the cantilevered section 6 and the lifting frame 3.

The pins 15 and holes 16 are arranged to interact with each other, i.e. each of the pins 15 is accommodated in a corresponding hole 16, when the lifting frame 3 is adjacent the support column 11 or sidewall 14 such that horizontal movement of the lifting frame 3 relative to the vehicle body 8 is restricted. By having two pins 15 and complimentary holes 16 rotational horizontal movement, i.e. twisting, of the lifting frame relative to the vehicle body 8 is restricted.

It is noted that the circular peripheries (i.e. the complimentary shapes) of the pins 15 and the holes 16 necessitate the solution of having two of each to restrict rotational movement of the lifting frame relative to the vehicle body 8. However, in other embodiments of the invention, having at least two first guide elements and at least two complimentary second guide elements are not essential for restricting the rotational movement. In other embodiments, rotational movement of the lifting frame 3 relative to the cantilevered section 6 may for instance be restricted by designing the first guide element as a pin/protrusion having a square or rectangular peripheral shape, and the second guide element as a cooperating hole having a complimentary square or rectangular peripheral shape. In another, there might be two (or more) pins 15 engaging the internal surface of a slot or other shaped aperture configured to accept the pins 15. In general, to restrict rotational horizontal movement between the lifting frame and the vehicle body while having a single first guide element and a single second guide element it may be sufficient to provide the first and second guide elements with complimentary non-circular peripheral shapes.

By having the second guide device 13 slidably connected to the support column 11 or the peripheral sidewall 14 of the vehicle body 8, the lifting frame 3 can be raised from a lower position close to the rail system 108 where it emerges from the lateral constraints of the storage grid, to a higher position adjacent the support column 11 while horizontal movement of the lifting frame 3 relative to the cantilevered section 6 is restricted or prevented. Such restriction of horizontal movement would be between a lower position and an upper position. The lower position may be when a lowermost level of the lifting frame 3 is above an uppermost level of a rail grid 108 upon which the container handling vehicle is arranged. In the upper position, the lifting frame 3 may be fully raised towards the cantilevered section 6.

Thus, due to the lifting frame guide assembly 12,13, the container handling vehicle according to the invention may start rotation of the cantilevered section 6 as soon as the lifting frame is in the lower position, e.g. after storing a storage container 106 in a storage column 105. In most instances when the lifting frame is not connected to a storage container 106, the lifting frame is kept in the lower position while the container handling vehicle moves upon the rail system 108. In this manner time and energy is also saved by not requiring the lifting frame to be lifted between the cantilever section and the lower position when a storage container is to be retrieved. The lifting frame guide assembly 12,13 will also ensure that the container handling vehicle 10 can move upon the rail system 108 as soon as a storage container connected to the lifting frame 3 is lifted above the rail system 108, see e.g. FIG. 12b.

Figure 24:
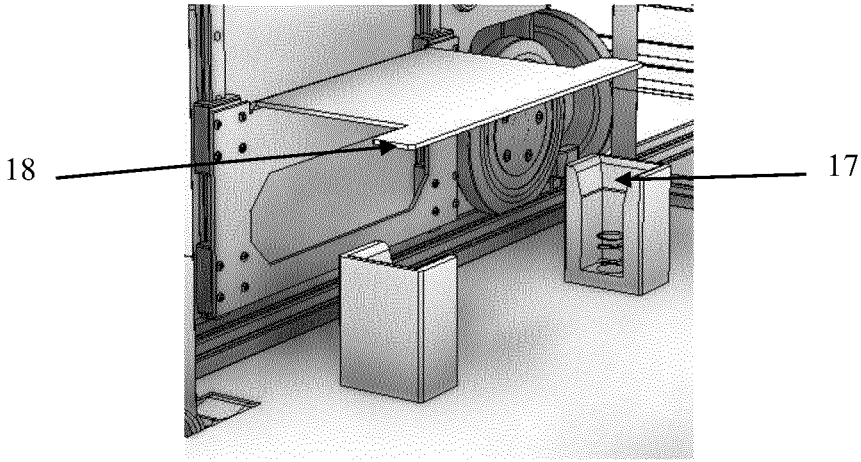
FIGS. 24 and 25 are perspective views of different lifting frame guide assemblies for use in any of the embodiments of the container handling vehicle according to the invention.
Figure 25:
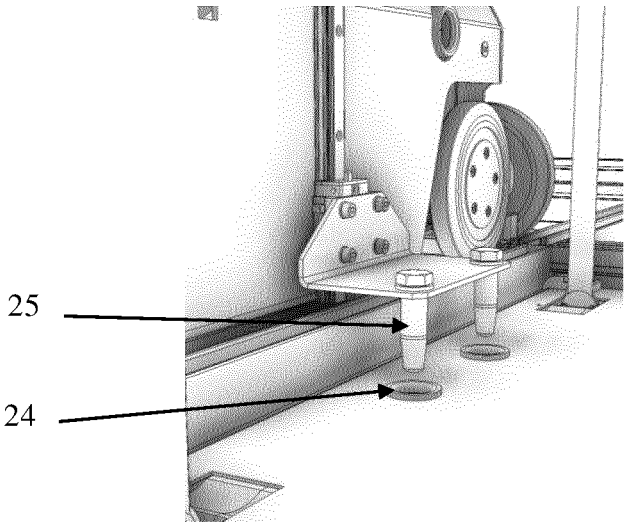

The lifting frame guide is described by a specific combination of guide elements, i.e. vertical pins and holes, for restricting a horizontal movement of the lifting frame. However, based on the present disclosure multiple alternative combinations of guide elements having complimentary shapes providing a restricted horizontal movement may easily be envisioned, e.g. various combinations of protrusion(s)/recess(es). Further exemplary embodiments of lifting frame guides having guide elements, such as pins 25, protrusions 18, recesses 17 and holes 24 are shown in FIGS. 24 and 25.

A second exemplary embodiment of a container handling vehicle 10' according to the invention is shown in FIGS. 15-20. The second embodiment is only distinguished from the first embodiment in FIGS. 5-14 in that the wheeled base 9' is smaller and does not comprise a container carrier section 20. As shown, the wheeled base 9' of the second embodiment fits within a single grid cell 122 of the rail system, while the wheeled base 9 of the first embodiment fits within two adjacent grid cells 122. The smaller wheeled base 9' is particularly advantageous when the container handling vehicle operates in cooperation with other container handling vehicles 401 featuring a container carrier 29. Vehicles only featuring a wheeled base 9' and a container carrier 29 for handling of storage containers may also be termed container transfer vehicles. The wheeled base 9' of the second exemplary embodiment and the container transfer vehicle 401 may for instance be a wheel base unit as disclosed in WO 2019/238703 A1.

Figure 21:
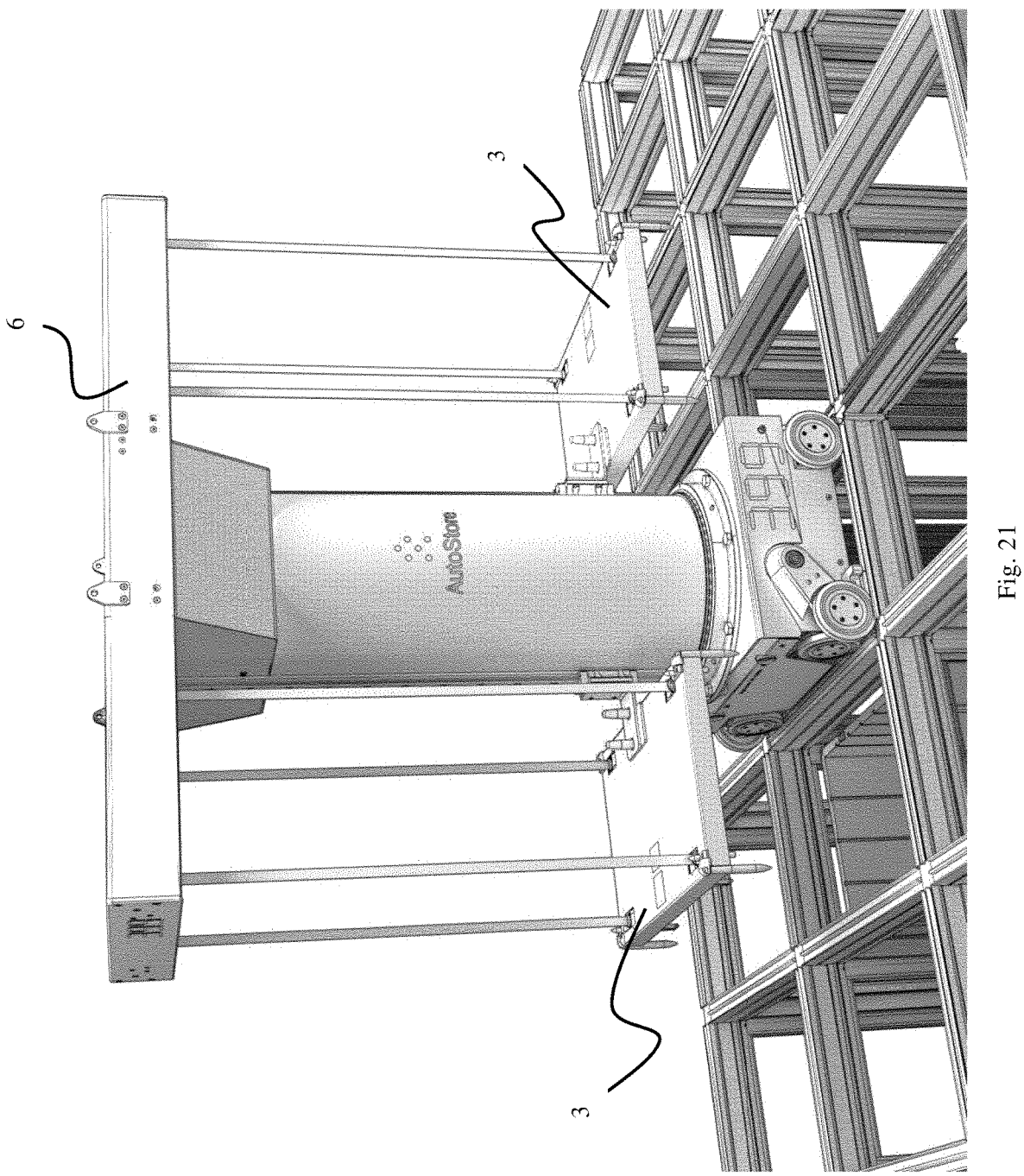
FIGS. 21-22 are perspective views of a third exemplary container handling vehicle according to the invention.
Figure 22:
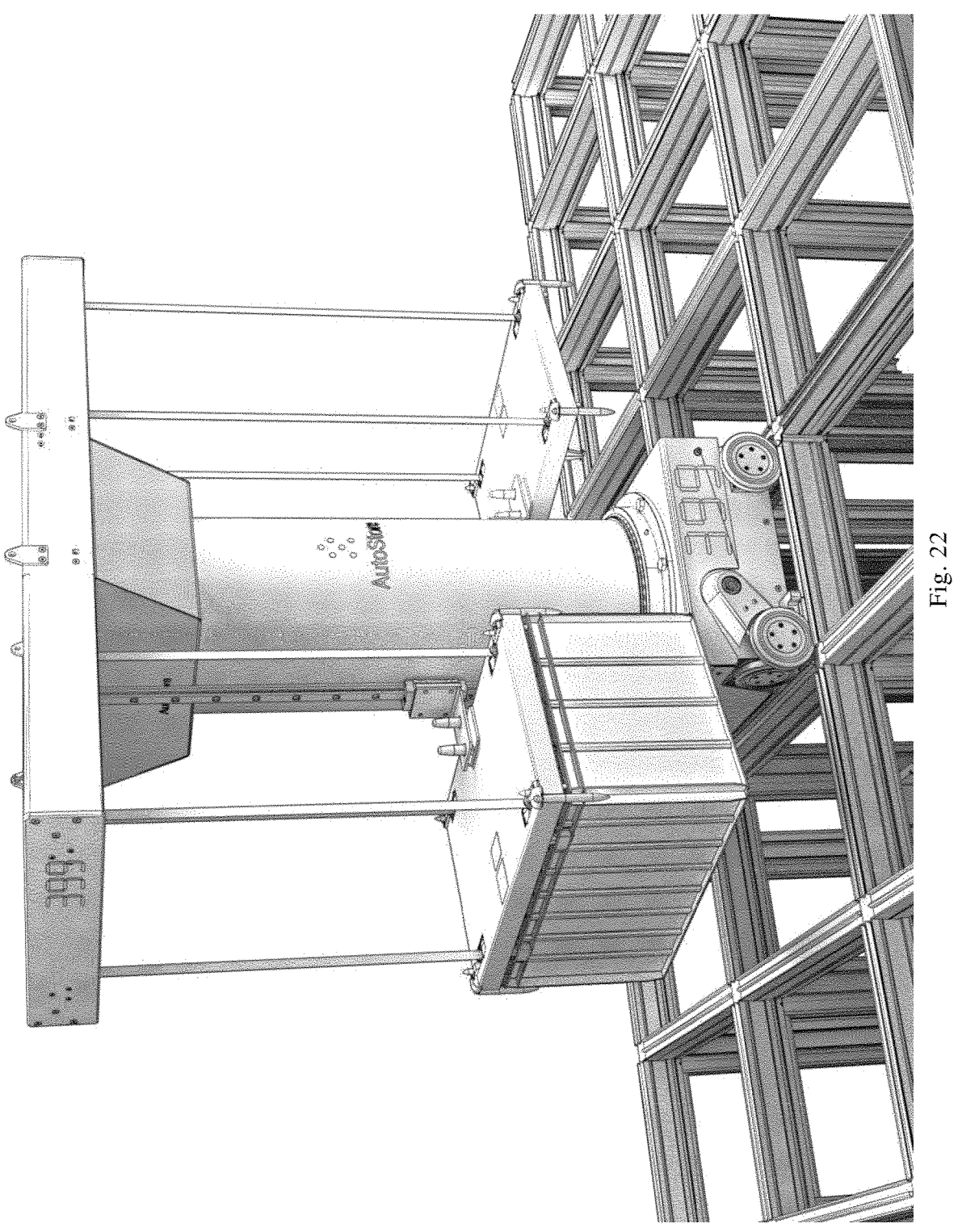

A third exemplary embodiment of a container handling vehicle 10" according to the invention is shown in FIGS. 21-22. The third embodiment is distinguished from the second embodiment in that the cantilevered section features two lifting frames 3 which extends on two opposite sides of the support column 11. The third embodiment may consequently handle two storage containers simultaneously, a function that may be advantageous in various digging operations.

All embodiments of the container handling vehicle according to the invention are highly advantageous in performing various digging operations in a storage system as shown in FIG. 1. In addition, all embodiments allow for an improved transport of multiple storage containers in the storage system, either by transporting a stack of storage containers upon the container handling vehicle itself, or by transporting a stack of storage containers by use of a dedicated container transfer vehicle.

Figure 11:
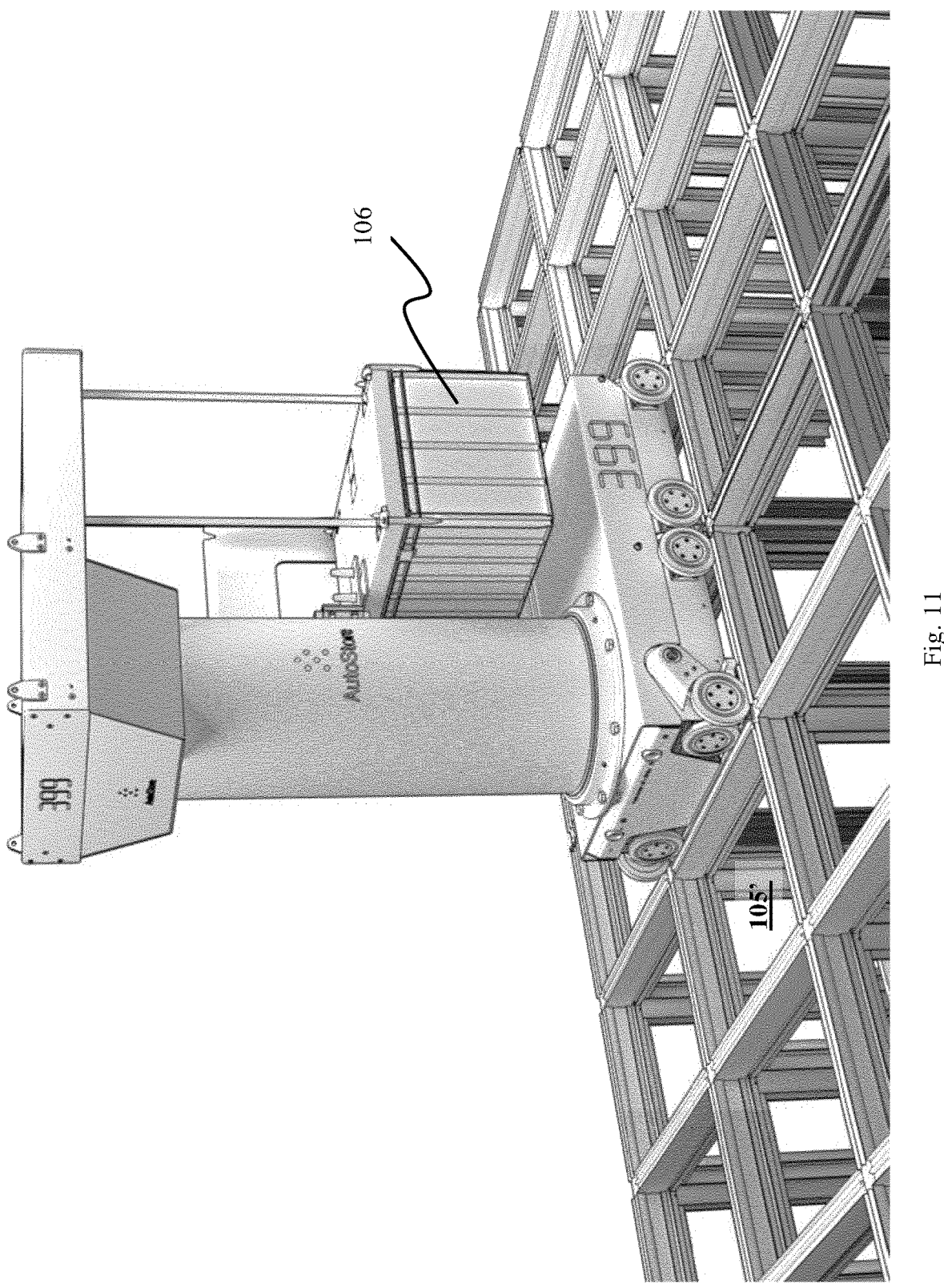
Figure 12B:
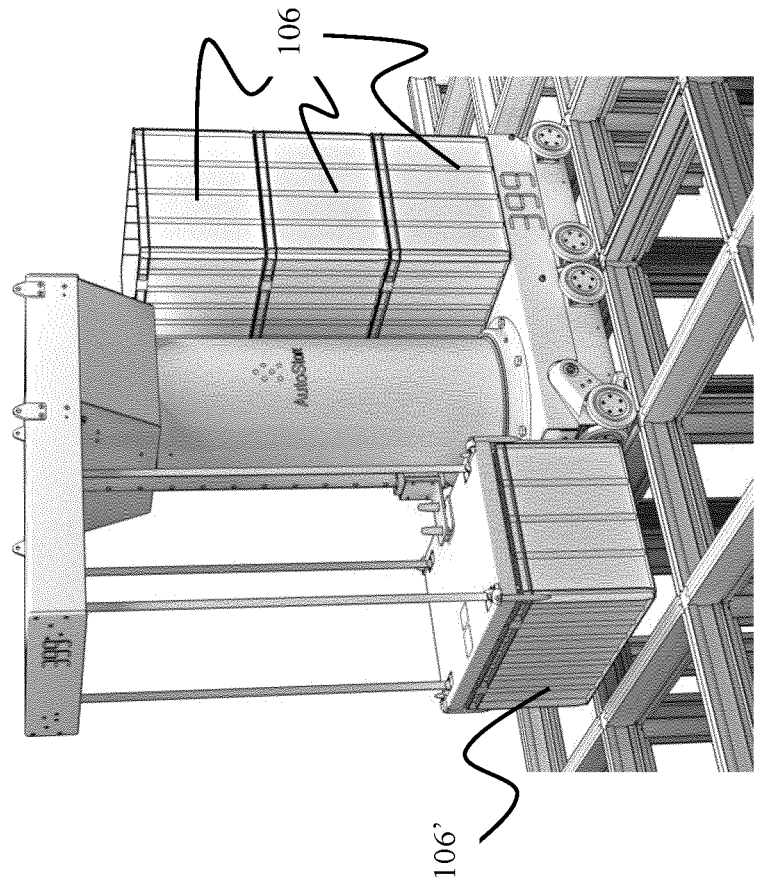
Figure 12A:
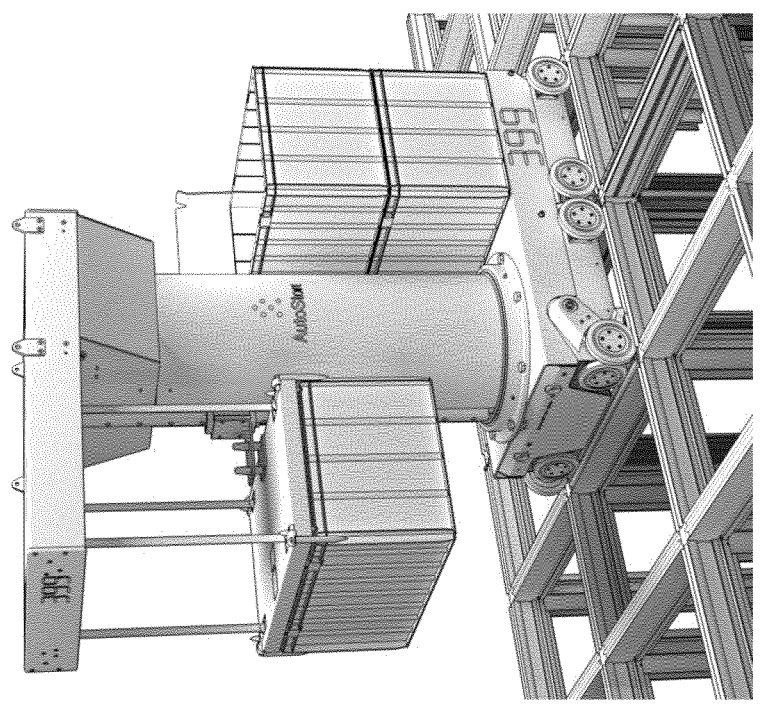
Figure 13:
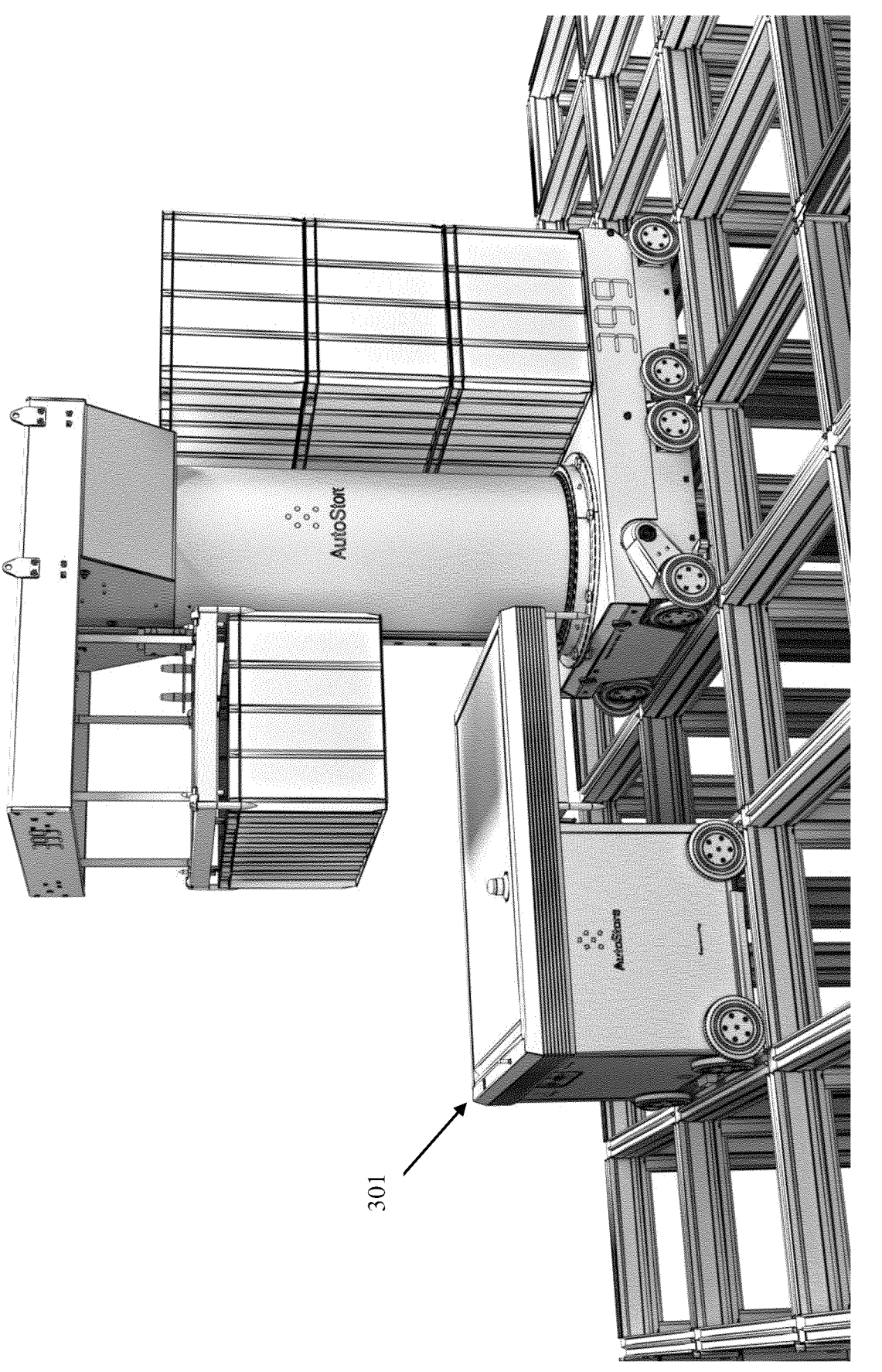
Figure 14:
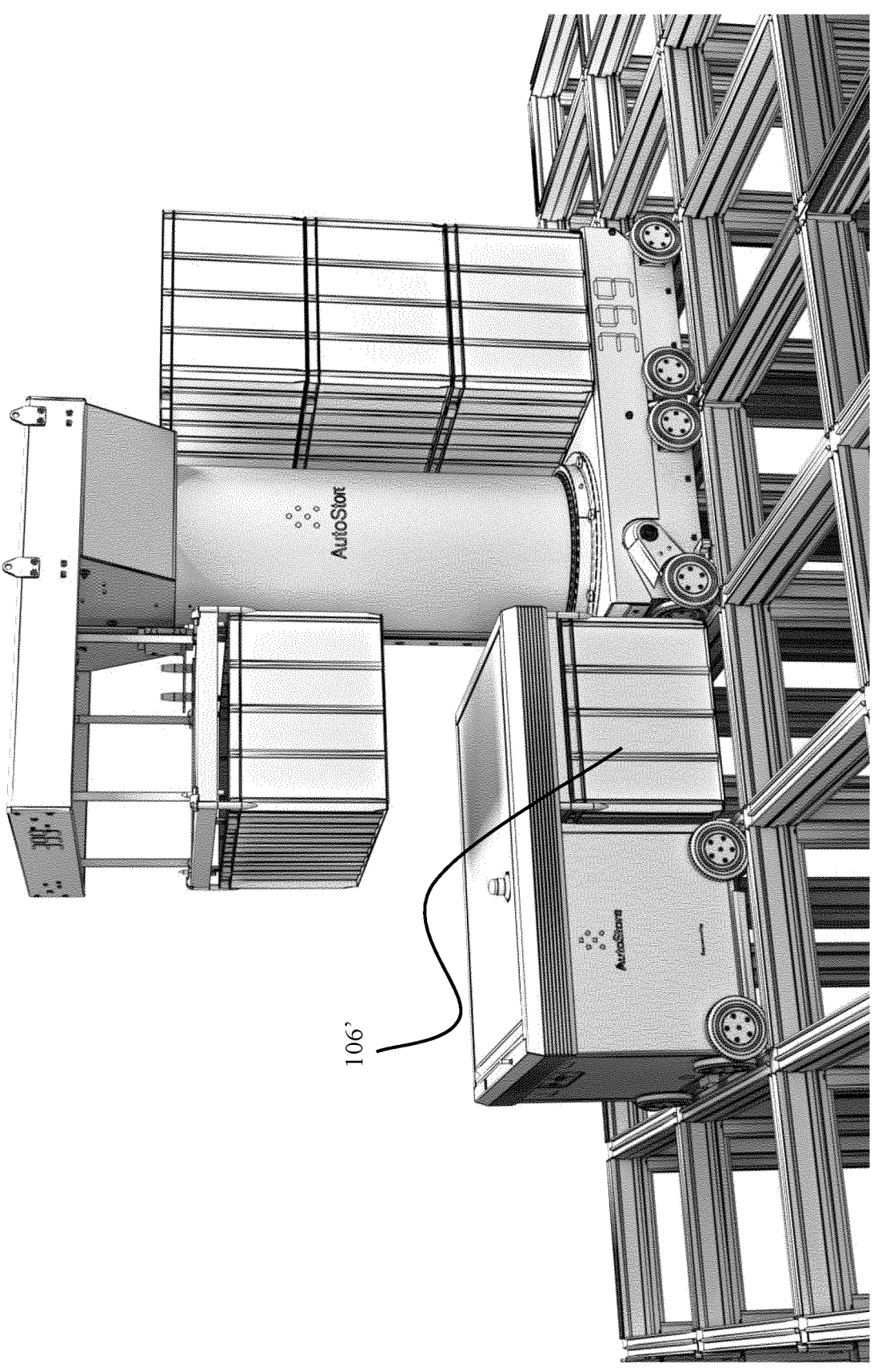
Figure 15:
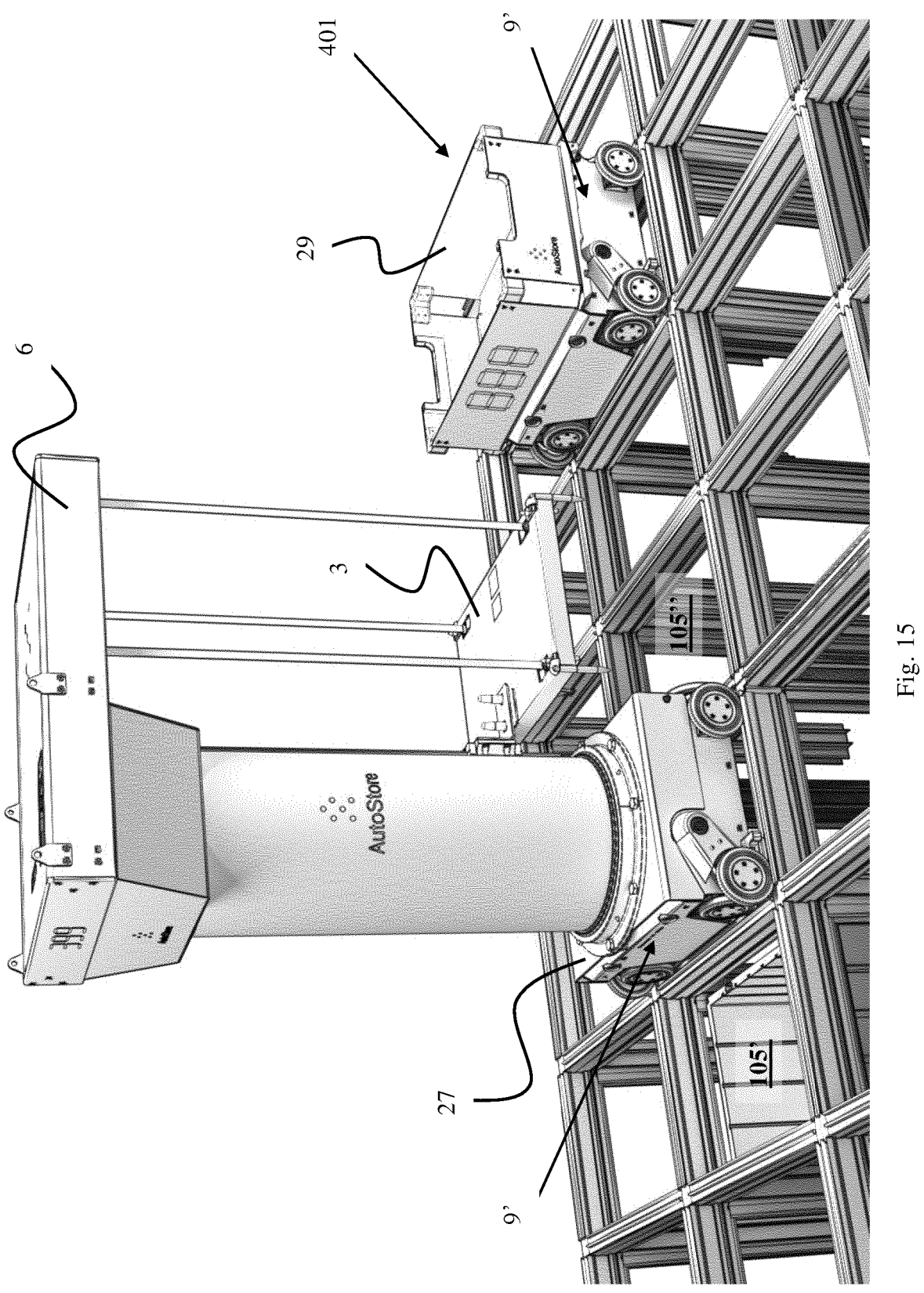
Figure 16:
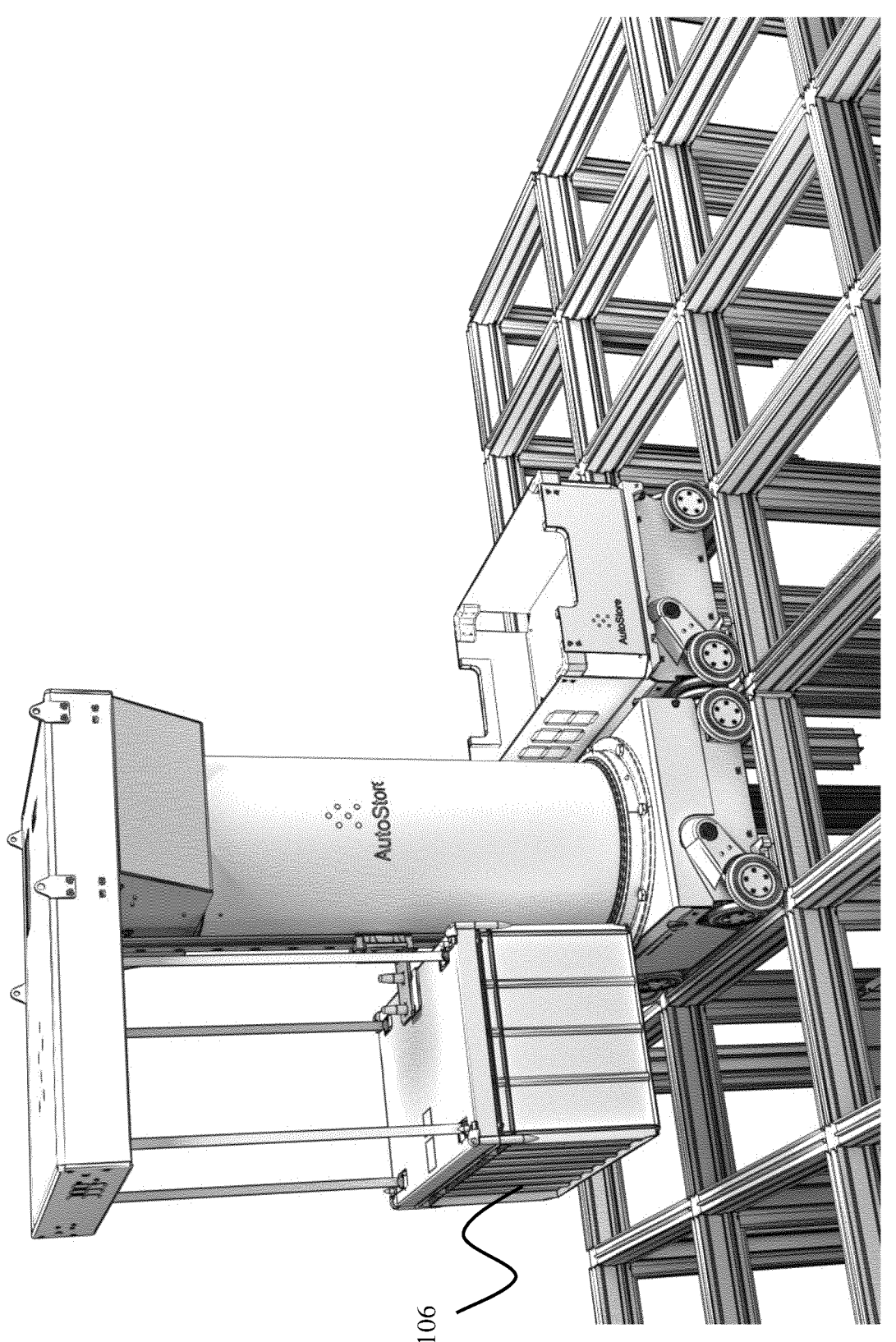
Figure 17B:
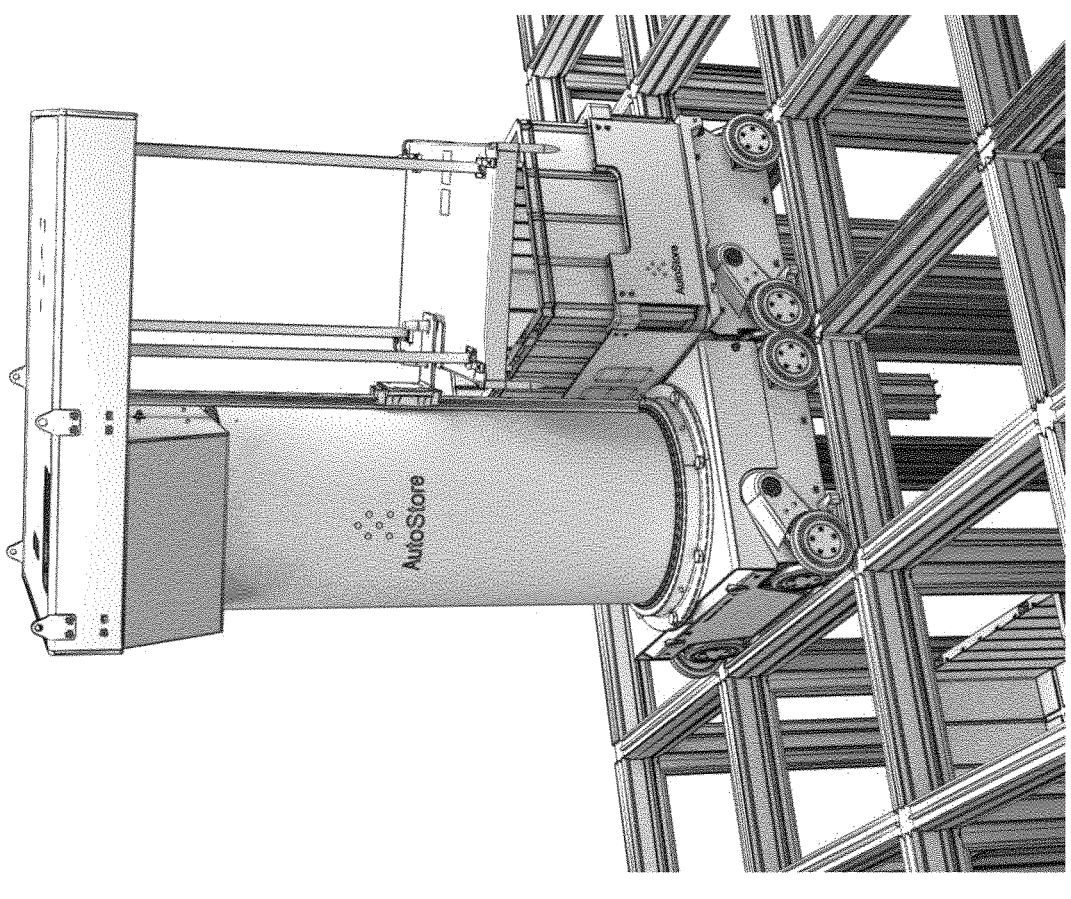
Figure 17A:
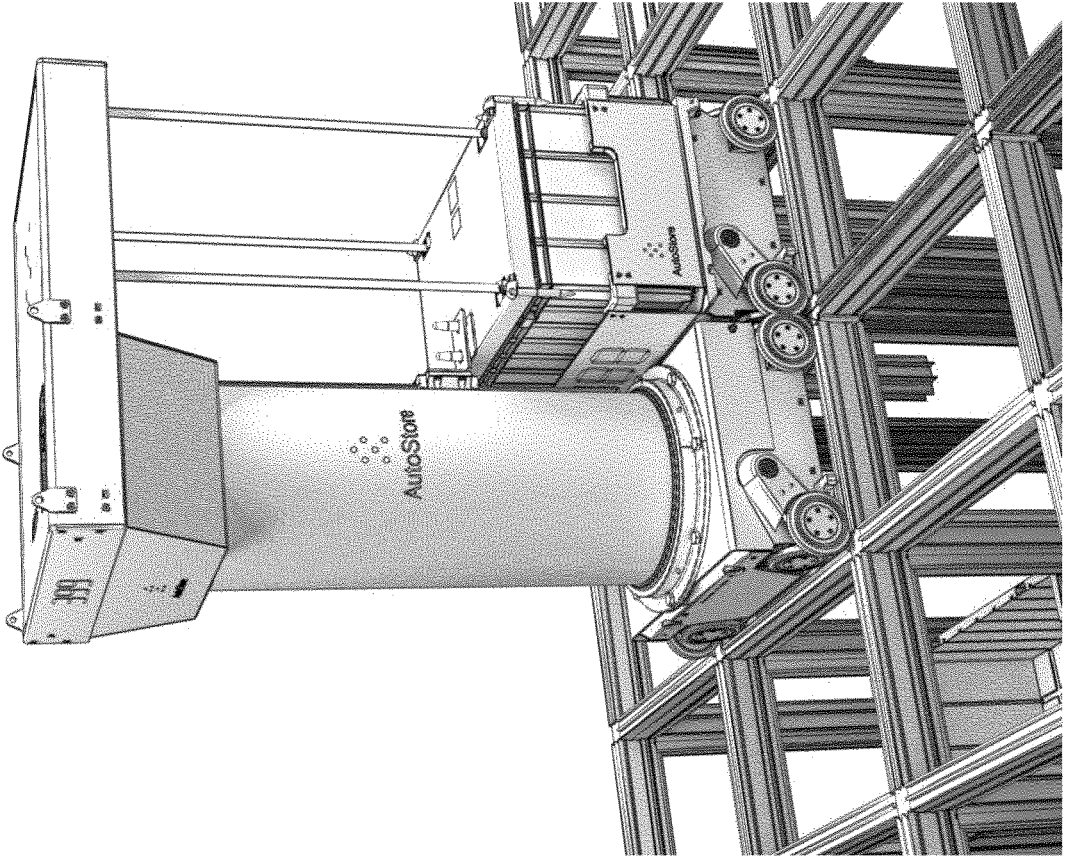
Figure 19:
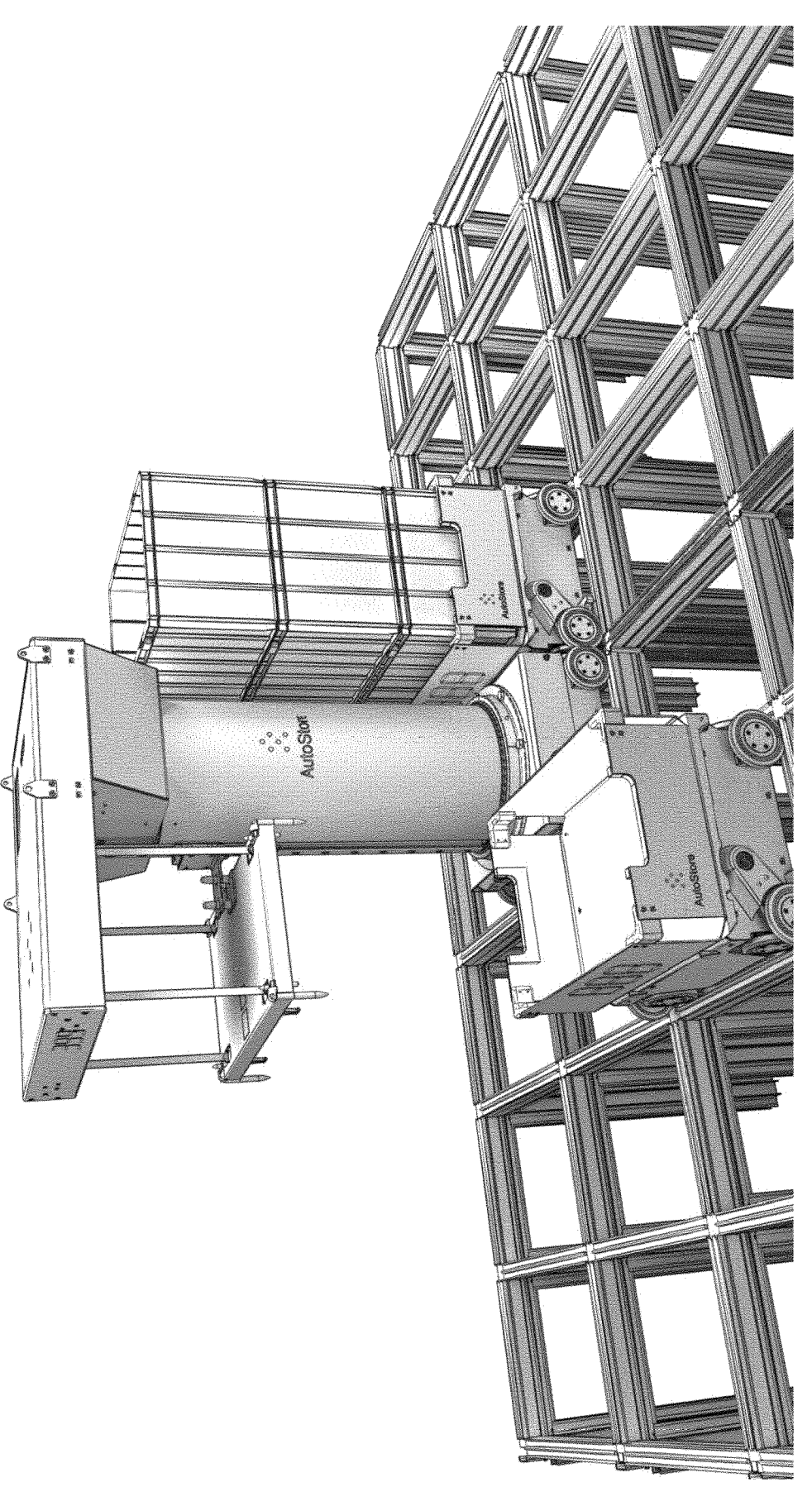

In an exemplary digging operation, see FIGS. 9-14 for the first embodiment and 15-20 for the second embodiment, the inventive container handling vehicles 10-10" may for instance retrieve a target storage container 106' from a storage system as shown in FIG. 1 by the following steps:

a. identifying a first storage column 105' in which the target storage container 106' is stored;

b. moving the first container handling vehicle upon the rail grid 108 to a position wherein the wheeled base 9,9' is adjacent to the first storage column 105';

c. arranging the cantilevered section 6 in a first position, wherein the cantilevered section 6 is arranged directly above the first storage column 105', i.e. such that the lifting frame 3 may be lowered into the first storage column 105';

d. retrieving a non-target storage container 106 from a stack of storage containers in the first storage column 105' by use of the lifting frame 3, see FIGS. 9 and 16;

e. rotating the cantilevered section 6 to a second position, see FIGS. 11 and 17a, wherein the cantilevered section 6 extends in an opposite direction relative to the direction in the first position. Due to the lifting frame guide, the rotation may commence as soon as the bottom of the storage container is at a level above the top side 27 of the wheeled base 9,9';

f. placing the non-target storage container at a second storage column 105" adjacent to the wheeled base, on a container carrier section 20 of the wheeled base 9, see FIG. 11, or on a second container handling vehicle 401 comprising a container carrier 29, see FIG. 17a;

g. rotating the cantilevered section to the first position;

h. repeating steps d-f and optionally step g until the target storage container is the uppermost storage container in the first storage column, see FIGS. 12a-b and 18a-b; and i. retrieving the target storage container 106' from the first storage column 105' by use of the lifting frame 3; or j. retrieving the target storage container 106' from first storage column 105' by use of a second container handling vehicle 301 comprising a container lifting assembly.

In step f, one option is to place the non-target storage container(s) 106 at a second storage column 105" adjacent to the wheeled base 9'. This option is only possible when using the second or third embodiment, wherein the cantilevered section may be arranged such that the lifting frame may access the second storage column 105" when the cantilevered section is in the second position.

When step h is repeated, a stack of a plurality of non-target storage containers 106 stacked on top of each other is created. In the stack, at least the upper non-target storage container 106 is arranged above the upper level of the rail grid 108. When the stack is arranged on a container carrier section 20 or container carrier 29, all non-target storage containers in the stack are arranged above the upper level of the rail grid 108.

Figure 20:
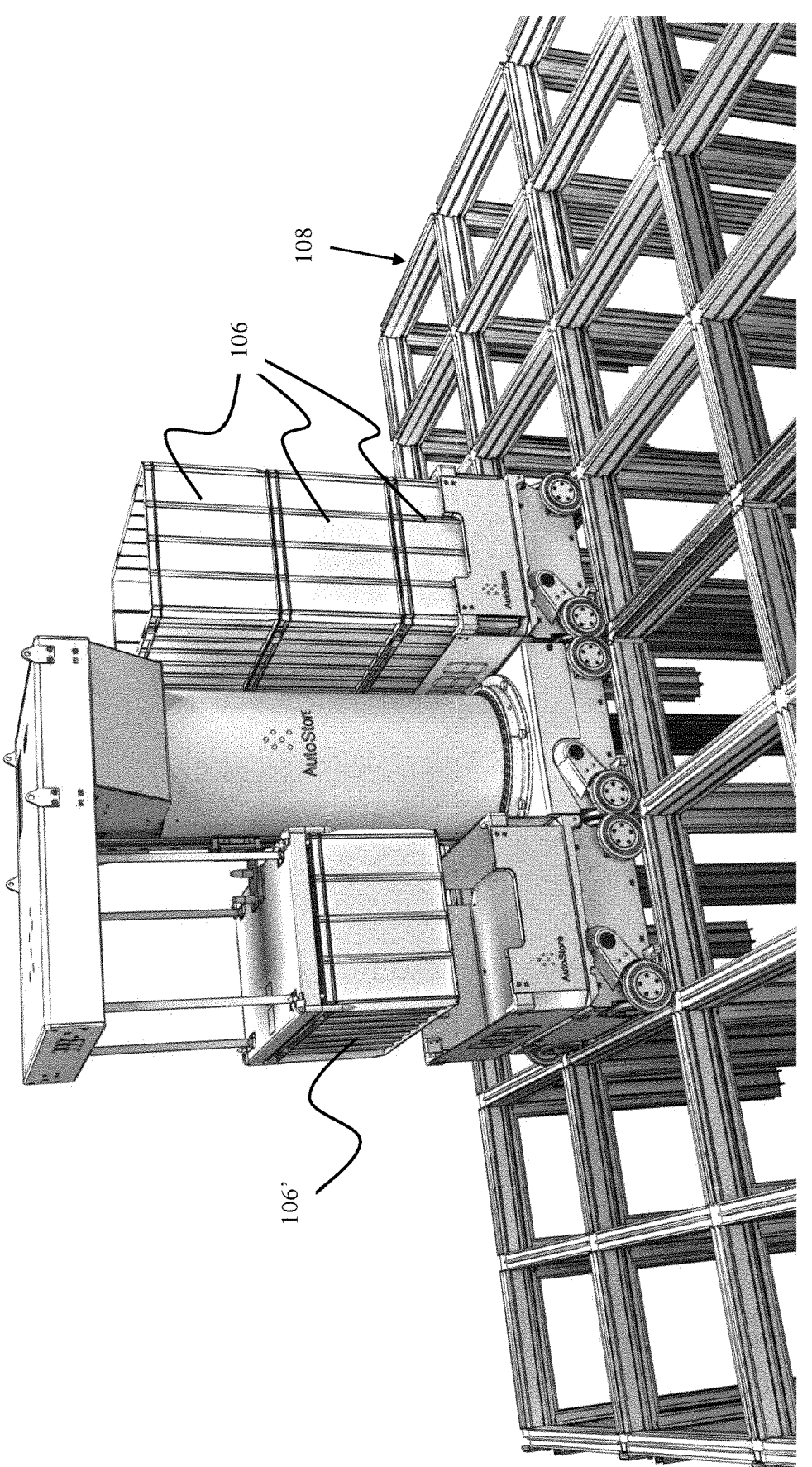

The target storage container 106' retrieved in step i, see FIG. 20, may subsequently be lowered onto a container carrier 29 of a second container handling vehicle 401 arranged under the cantilevered section 6.

The inventive container handling vehicles 10-10" are also highly advantageous in operations in which a plurality of storage containers are to be retrieved from or stored in a storage column or system.

LIST OF REFERENCE NUMBERS

1 Prior art automated storage and retrieval system
2 Container lifting assembly 3 Lifting frame
4 Gripping/engaging devices
5 Lifting bands
6 Cantilevered section
7 Lifting shaft assembly
8 Vehicle body
9 Wheeled base
10-10" Container handling vehicle according to the invention
11 Support, support column
12 First guide device
13 Second guide device
14 Peripheral sidewall
15 First guide element, vertical pin
16 Second guide element, hole
17 Lower end of support
18 Upper portion of support
19 Rail
20 Container carrier section
21a First set of wheels
21b Second set of wheels
22a First plate section
22b Second plate section
23 Storage container support
24 support surface
25 Pin(s)
26 Guiding pins/contact sensors
27 Top side
28 Vertical corner section
29 Container carrier
30 Slewing ring
100 Framework structure
102 Upright members of framework structure
103 Horizontal members of framework structure
104 Storage grid
105 Storage column
105' First storage column
105" Second storage column
106 Storage container
106' Target storage container
107 Stack
108 Rail system, rail grid
110 Parallel rails in first direction (X)
110a First rail in first direction (X)
110b Second rail in first direction (X)
111 Parallel rail in second direction (Y)
111a First rail of second direction (Y)
111b Second rail of second direction (Y)
112 Access opening
119 First port column
120 Second port column
122 Grid cell, i.e. outline of a grid cell
201 Prior art container handling vehicle
201a Vehicle body of the container handling vehicle 201
201b Wheel arrangement, first direction (X)
201c Wheel arrangement, second direction (Y)
301 Prior art cantilever container handling vehicle
301a Vehicle body of the container handling vehicle 301
301b Wheel arrangement, first direction (X)
301c Wheel arrangement, second direction (Y)
304 Guide pins
401 Prior art container handling vehicle featuring a container carrier
500 Control system
X First direction
Y Second direction
Z Third direction

The invention claimed is:

1. A container handling vehicle for lifting a storage container from an underlying framework structure, the vehicle comprises a vehicle body and a container lifting assembly for lifting the storage container;

the vehicle body comprises a wheeled base, a support, and at least one cantilevered section; wherein the wheeled base comprises a first set of wheels, arranged on opposite sides of the vehicle body, for moving the vehicle along a first direction on a rail grid at a top level of the underlying framework structure, a second set of wheels arranged on other opposite sides of the vehicle body, for moving the vehicle along a second direction on the rail grid, the second direction being perpendicular to the first direction, and a container carrier section having a support surface upon which a storage container may be arranged; and the support comprises a lower end connected to the wheeled base and an upper portion connected to the cantilevered section;

the container lifting assembly comprises a lifting frame and a plurality of lifting bands, the lifting frame being for releasable connection to a storage container and suspended from the cantilevered section by the lifting bands, such that the lifting frame may be raised or lowered relative to the cantilevered section;

the cantilevered section extends laterally from the upper portion of the support and is arranged to rotate horizontally about a vertical axis relative to the wheeled base between a first position and a second position, in the first position, the cantilevered section extends beyond the wheeled base, such that the lifting frame may retrieve or deliver a storage container from/to a storage column of the framework structure, and in the second position the cantilevered section extends in an opposite direction relative to the direction in the first position, and the cantilevered section extends above the container carrier section in the second position, such that the lifting frame may retrieve or deliver a storage container from/to the surface of the container carrier section;

wherein the support holds the cantilevered section above the wheeled base at a height corresponding to a height of multiple storage containers, such that a vertical distance between the lifting frame, when the lifting frame is in an upper position, and the lower end of the support is larger than the height of two storage containers stacked on top of each other.

2. A vehicle according to claim 1, wherein the vertical distance is at least 660 mm, such that the lifting frame is positionable above a stack of at least two storage containers when each storage container has a height of 330 mm and a bottom of the stack is supported at a level corresponding to the level of the lower end of the support.

3. A vehicle according to claim 1, wherein the lifting frame is positionable above a stack of at least two storage containers when a bottom of the stack is supported at a level corresponding to the level of the lower end of the support, and the cantilevered section is in the second position.

4. A vehicle according to claim 1, wherein a horizontal periphery of the support is arranged to be within the horizontal periphery of the wheeled base during rotation of the cantilevered section.

5. A vehicle according to claim 1, wherein the lower end of the support is rotationally connected to the wheeled base by a slewing ring.

6. A vehicle according to claim 1, wherein the support is a column.

7. A vehicle according to claim 1, wherein the container lifting assembly features a lifting frame guide assembly comprising a first guide device and a cooperating second guide device;

the first guide device is provided on the lifting frame; and the second guide device is slidably connected to the vehicle body via at least one vertical rail, such that the second guide device can move in a vertical direction relative to the support;

the first guide device and the second guide device are arranged to interact with each other when the lifting frame is adjacent the at least one vertical rail, such that horizontal movement of the lifting frame relative to the cantilevered section is restricted.

8. A vehicle according to claim 7, wherein the vertical rail extends from a lower level of the support towards the cantilevered section, such that the second guide device may move in a vertical direction between a lower position adjacent to the support and an upper position in which the lifting frame docks with the cantilevered section.

9. A vehicle assembly comprising a first container handling vehicle according to claim 1 and a second container handling vehicle, wherein the second container handling vehicle comprises a wheeled base and a container carrier arranged on top of the wheeled base, the wheeled base of the second container handling vehicle being positionable adjacent to the wheeled base of the first container handling vehicle, such that the lifting frame of the first container handling vehicle is positionable above the container carrier of the second container handling vehicle.

10. A storage system comprising a framework structure and a first container handling vehicle according to claim 1, wherein the framework structure comprises multiple storage columns, in which storage containers may be stored stacked on top of one another in vertical stacks, and the first container handling vehicle is operated on a rail grid at a top level of the framework structure for retrieving storage containers from, and storing storage containers in, the storage columns, and for transporting the storage containers horizontally across the rail grid.

11. A storage system according to claim 10, comprising a second container handling vehicle operated on the rail grid for transporting storage containers horizontally across the rail grid and optionally for retrieving storage containers from, and storing storage containers in, the storage columns, wherein the cantilevered section of the first container handling vehicle is arranged at a level allowing the second container handling vehicle to be positioned under the lifting frame of the first container handling vehicle when the lifting frame is in an uppermost position lifting a storage container.

12. A storage system according to claim 11, wherein the second container handling vehicle is configured to be positioned above the first storage column when the cantilevered section of the first container handling vehicle is in the first position, such that the second container handling vehicle is positionable to retrieve a storage container from the first storage column or receive a storage container from the first container handling vehicle.

13. A method of retrieving a target storage container from a storage system comprising a framework structure and a first container handling vehicle according to claim 1, wherein the framework structure comprises multiple storage columns, in which storage containers may be stored stacked on top of one another in vertical stacks, and the first container handling vehicle is operated on a rail grid at a top level of the framework structure for retrieving storage containers from, and storing storage containers in, the storage columns, and for transporting the storage containers horizontally across the rail grid, the method comprising the steps of:

a. identifying a first storage column in which the target storage container is stored;

b. moving the first container handling vehicle upon the rail grid to a position wherein the wheeled base is adjacent to the first storage column;

c. arranging the cantilevered section in a first position, wherein the cantilevered section is arranged directly above the first storage column;

d. retrieving a non-target storage container from a stack of storage containers in the first storage column by use of the lifting frame;

e. rotating the cantilevered section to a second position, wherein the cantilevered section extends in an opposite direction relative to the direction in the first position;

f. placing the non-target storage container at a second storage column adjacent to the wheeled base, on a container carrier section of the wheeled base or on a container carrier of a second container handling vehicle;

g. rotating the cantilevered section to the first position;

h. repeating steps d-f and optionally step g until the target storage container is the uppermost storage container in the first storage column; and i. retrieving the target storage container from the first storage column by use of the lifting frame; or j. retrieving the target storage container from the first storage column by use of a container handling vehicle comprising a container lifting assembly.

14. A method according to claim 13, wherein step h creates a stack of a plurality of non-target storage containers stacked on top of each other, wherein at least an upper non-target storage container is arranged above the upper level of the rail grid.

15. A method according to claim 13, wherein step h creates a stack of a plurality of non-target storage containers stacked on top of each other, wherein a retrieved non-target storage container(s) is/are arranged above the upper level of the rail grid and carried by a container handling vehicle.

16. A method of retrieving a plurality of storage containers from a storage system comprising a framework structure and a first container handling vehicle according to claim 1, wherein the framework structure comprises multiple storage columns, in which storage containers may be stored stacked on top of one another in vertical stacks, and the first container handling vehicle is operated on a rail grid at a top level of the framework structure for retrieving storage containers from, and storing storage containers in, the storage columns, and for transporting the storage containers horizontally across the rail grid, the method comprising the steps of:

a. identifying a storage column in which the plurality of storage containers are stored;

b. moving the first container handling vehicle upon the rail grid to a position wherein the wheeled base is adjacent to the storage column;

c. arranging the cantilevered section in a first position, wherein the lifting frame is arranged directly above the storage column;

d. retrieving one of the plurality of storage containers from the storage column by use of the lifting frame;

e. rotating the cantilevered section to a second position, wherein the cantilevered section extends in an opposite direction relative to the direction in the first position;

f. placing the storage container on a container carrier section of the wheeled base or on a container carrier of a second container handling vehicle;

g. rotating the cantilevered section to the first position; and h. repeating steps d-f and optionally step g until the plurality of storage containers are retrieved as a stack of storage containers stacked on top of each other.

17. A method of storing a plurality of storage containers in a storage system comprising a framework structure and a first container handling vehicle according to claim 1, wherein the framework structure comprises multiple storage columns, in which storage containers may be stored stacked on top of one another in vertical stacks, and the first container handling vehicle is operated on a rail grid at a top level of the framework structure for retrieving storage containers from, and storing storage containers in, the storage columns, and for transporting the storage containers horizontally across the rail grid, the method comprising the steps of:

a. placing the plurality of storage containers, as a stack of storage containers stacked on top of each other, on a container carrier section of the wheeled base of the first container handling vehicle or on a container carrier of a second container handling vehicle;

b. identifying a storage column in which the plurality of storage containers are to be stored;

c. moving the first container handling vehicle upon the rail grid to a position wherein the wheeled base is adjacent to the storage column;

d. arranging the cantilevered section in a second position, wherein the lifting frame is arranged directly above the container carrier section or the container carrier;

e. retrieving one of the plurality of storage containers from the stack of storage containers on the container carrier section or the container carrier by use of the lifting frame;

f. rotating the cantilevered section to a first position, wherein the cantilevered section extends in an opposite direction relative to the direction in the second position, wherein the lifting frame is arranged directly above the storage column;

g. storing the storage container in the storage column;

h. rotating the cantilevered section to the second position; and i. repeating steps d-g and optionally step h until the plurality of storage containers are stored in the storage column.

* * * * *